(12) United States Patent
Suzuki et al.

(10) Patent No.: US 8,009,187 B2
(45) Date of Patent: Aug. 30, 2011

(54) LENS SHEET AND PRINTER

(75) Inventors: Katsuhito Suzuki, Matsumoto (JP); Tomio Sonehara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/017,802

(22) Filed: Jan. 31, 2011

(65) Prior Publication Data

US 2011/0128315 A1 Jun. 2, 2011

Related U.S. Application Data

(62) Division of application No. 11/703,290, filed on Feb. 6, 2007, now Pat. No. 7,907,163.

(30) Foreign Application Priority Data

Feb. 6, 2006 (JP) ................. 2006-028025

(51) Int. Cl.
*B41J 15/14* (2006.01)
*B41J 27/00* (2006.01)
(52) U.S. Cl. ....................... 347/244; 347/258
(58) Field of Classification Search .......... 347/229, 347/234–235, 244, 248–250, 258; 359/454, 359/455, 463
See application file for complete search history.

(56) References Cited

U.S. PATENT DOCUMENTS

| | | |
|---|---|---|
| 5,695,346 A | 12/1997 | Sekiguchi et al. |
| 5,812,152 A * | 9/1998 | Torigoe et al. ............... 347/2 |
| 5,967,032 A | 10/1999 | Bravenec et al. |
| 5,974,967 A | 11/1999 | Bravenec et al. |
| 6,064,424 A | 5/2000 | van Berkel et al. |
| 6,073,854 A | 6/2000 | Bravenec et al. |
| 6,329,987 B1 | 12/2001 | Gottfried et al. |
| 6,373,637 B1 | 4/2002 | Gulick, Jr. et al. |
| 6,414,794 B1 | 7/2002 | Rosenthal |
| 6,486,937 B2 * | 11/2002 | Morton et al. ............... 355/22 |
| RE38,065 E | 4/2003 | Bravenec et al. |
| 6,727,972 B2 * | 4/2004 | Cobb et al. ................. 355/22 |
| 6,870,674 B2 | 3/2005 | Ookawa et al. |
| 7,457,038 B2 | 11/2008 | Dolgoff |

FOREIGN PATENT DOCUMENTS

| | | |
|---|---|---|
| CN | 1272817 A | 11/2000 |
| EP | 0 791 847 A1 | 8/1997 |
| JP | 3471930 A | 5/1996 |
| JP | 11078313 A | 3/1999 |
| JP | 2002174866 A | 6/2002 |
| JP | 2003-011406 | 1/2003 |
| JP | 2005-186477 A | 7/2005 |
| JP | 2005-350093 | 12/2005 |
| JP | 2006-018608 A | 1/2006 |
| JP | 2006-020098 A | 1/2006 |

OTHER PUBLICATIONS van Berkel, C. et al., Characterisation and Optimisation of 3D-LCD Module Design, Published Proc SPIE, vol. 3012, pp. 179-187 (1997).

* cited by examiner

*Primary Examiner* — Hai C Pham
(74) *Attorney, Agent, or Firm* — Nutter McClennen & Fish LLP; John J. Penny, Jr.; Michael P. Visconti, III

(57) ABSTRACT

A lens sheet has an external shape of a rectangle or a square defined by four sheet ends in a vertical direction thereto. The lens sheet includes: a first surface, on which a plurality of lenses extending in a direction inclined to one of the sheet ends are arranged in parallel with each other; and a second surface opposite to the first surface, on which a printing is to be performed or to which a printed medium is to be stuck.

2 Claims, 17 Drawing Sheets

LENS SHEET AND PRINTER

CROSS-REFERENCE TO RELATED APPLICATIONS

This patent application claims priority to Japanese Patent Application No. 2006-028025 filed on Feb. 6, 2006, the entire contents of which are incorporated herein by reference. This application is a division of U.S. application Ser. No. 11/703,290 entitled "LENS SHEET AND PRINTER" filed on Feb. 6, 2007, now U.S. Pat. No. 7,907,163 the entire contents of which are incorporated herein by reference.

BACKGROUND

1. Technical Field

The present invention relates to a lens sheet and a printer capable of carrying out printing over the lens sheet.

2. Related Art

In some of various printing techniques, a print image is printed on a recording layer of a lens sheet including a lenticular lens having a large number of cylindrical convex lenses (which will be hereinafter referred to as convex lenses) arranged in parallel with each other (see Japanese Patent No. 3471930 (for example, paragraph Nos. 0066 to 0076 and FIGS. 1, 5, 8 and 9)).

In the printing technique, a large number of stripe-like subdivided images corresponding to a pitch of the convex lens are arranged and recorded on the recording layer of the lens sheet. In accordance with a type of the subdivided image, an image to be observed visually can be a three-dimensional image (a stereoscopic vision) or a moving image (an animation) with an observation angle changed. In a printing operation to be carried out over the lens sheet, generally, there is employed an arrangement in which a convex lens array is vertical or transverse with respect to both eyes (see Japanese Patent No. 3471930 (for example, paragraph Nos. 0066 to 0076 and FIGS. 1, 5, 8 and 9)).

In the art described in the Japanese Patent No. 3471930 (for example, paragraph Nos. 0066 to 0076 and FIGS. 1, 5, 8 and 9), however, the number of parallaxes to be dealt with is limited due to a printing width in a convex lens or a printing width is decreased with an increase in the number of parallaxes. The number of parallaxes easily influences a smoothness of an image and a printing width per parallax influences picture quality.

As a countermeasure to be taken, it can be proposed that a subdivided image is printed obliquely with respect to the lens sheet. In the method, however, the image is printed on the lens sheet having a larger area than an area of a necessary image portion and only the image portion is cut out of the lens sheet after the printing operation. The cut-out work wastes a residual portion of the lens sheet if any.

SUMMARY

An advantage of some aspects of the invention is to provide a lens sheet capable of avoiding waste and increasing a printing width. Another advantage of some aspects of the invention is to provide a printer capable of executing an excellent printing operation for a so-called oblique lens sheet.

According to an aspect of the invention there is provided a lens sheet having an external shape of a rectangle or a square defined by four sheet ends in a vertical direction thereto, the lens sheet comprising:

a first surface, on which a plurality of lenses extending in a direction inclined to one of the sheet ends are arranged in parallel with each other; and a second surface opposite to the first surface, on which a printing is to be performed or to which a printed medium is to be stuck.

The present disclosure relates to the subject matter contained in Japanese patent application No. 2006-028025 filed on Feb. 6, 2006, which is expressly incorporated herein by reference in its entirety.

BRIEF DESCRIPTION OF THE DRAWINGS

The invention will be described with reference to the accompanying drawings, wherein like numbers reference like elements.

FIG. 3A is a partial enlarged view obtained from a plan view and FIG. 3B is a partial enlarged view obtained from a sectional view.

FIG. 21A is a diagram showing a scanning position in a sub scanning direction of a carriage with respect to a lens sheet and FIG. 21B is a diagram showing a lens signal having a pulse width reduced on a sheet end of the lens sheet.

FIG. 22A is a diagram showing a complementary lens signal carrying out a complementary processing on the sheet end of the lens sheet and FIG. 22B is a diagram showing a complementary lens signal obtained after the complementary processing is further executed.

FIG. 25A is a diagram showing a lens signal itself, FIG. 25B is a diagram showing a state in which recording is carried out over a buffer, and FIG. 25C is a diagram showing the complementary lens signal which is generated.

DESCRIPTION OF EXEMPLARY EMBODIMENTS

An embodiment of a lens sheet and a printer according to the invention will be described below with reference to FIGS. 1 to 26. A printer 10 according to the embodiment is of an ink jet type. For the printer of the ink jet type, an apparatus employing any ejecting method may be used if a printing operation can be carried out by ejecting an ink. Moreover, the invention can be applied to printers other than the ink jet type, for example, a laser type, a sublimation heat transfer type or a dot impact type.

In the following description, a lower side indicates a side on which the printer 10 is disposed, and an upper side indicates a side which is separated from the side on which the printer 10 is disposed. Moreover, a direction in which a carriage 30 to be described below is moved is set to be a main scanning direction and a direction which is orthogonal to the main scanning direction and in which a lens sheet 12 is transported is set to be a sub scanning direction. Furthermore, description will be given on assumption that a side on which the lens sheet 12 is supplied is set to be a paper feeding side (a rear end side) and a side on which the lens sheet 12 is discharged is set to be a paper discharging side (this side).

<Referring to Lens Sheet>

Figure 1:
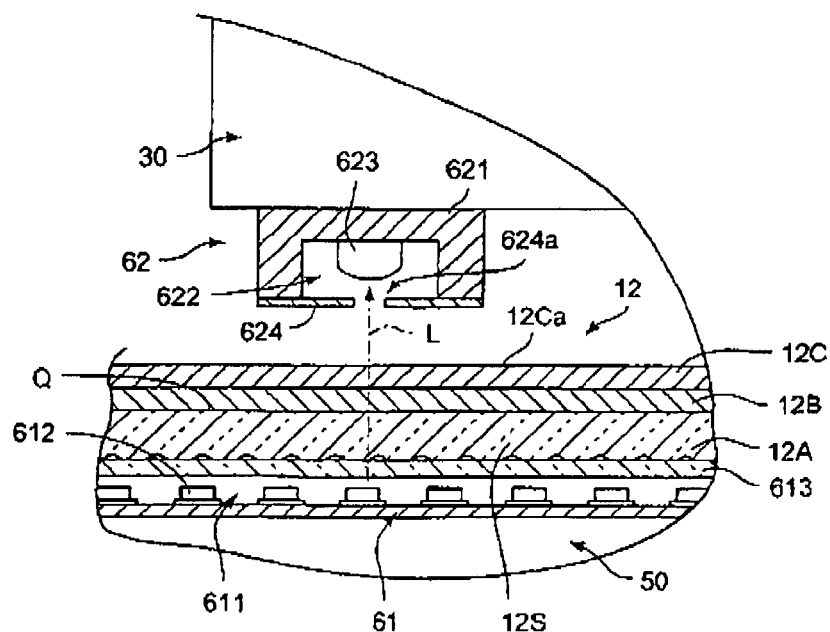
FIG. 1 is a front sectional view showing a structure of a lens detecting sensor in a printer according to an embodiment of the invention.

First of all, description will be given to the lens sheet 12 to be a printing object. As shown in FIG. 1, the lens sheet 12 includes a lenticular lens 12A positioned on a front face, an ink absorbing layer 12B provided in contact with a back face of the lenticular lens 12A, and an ink transmitting layer 12C positioned on a back face of the lens sheet 12. The lenticular lens 12A has such a structure that a plurality of cylindrical convex lenses (convex lenses 12A1) for setting one direction to be a longitudinal direction is disposed in parallel with each other at a certain pitch. In the lenticular lens 12A, a curvature of the convex lens 12A1 is set in such a manner that a focal point of a light proceeding through the respective convex lenses 12A1 is positioned on a back face of the lenticular lens 12A (a boundary surface Q with the ink absorbing layer 12B).

The lenticular lens 12A is formed of PET, PETG, APET, PP, PS, PVC, acryl or a UV resin. The ink absorbing layer 12B is equivalent to a print surface and an ink is fixed onto the print surface so that a print image is formed. The ink absorbing layer 12B may be a special paper to be stuck to the lenticular lens 12A or a roll-like paper. Moreover, the lens sheet 12 may have the ink transmitting layer 12C or not. Because of the presence of the ink transmitting layer 12C, it is possible to make a touch immediately after printing. Furthermore, it is also possible to provide another layer such as a transparent film layer or a bonding layer in addition to the ink transmitting layer 12C and the ink absorbing layer 12B. The lens sheet 12 may employ such a structure that the ink absorbing layer 12B and the ink transmitting layer 12C are not provided, and printing may be directly carried out over the back face of the lenticular lens 12A to set the back face itself of the lenticular lens 12A to be a print surface.

In the embodiment, some pitches of an arrangement (arrangement intervals) of the convex lenses 12A1 in the lenticular lens 12A are integer-time as great as a pitch of an arrangement of a line pattern of a scale 81 which will be described below. For example, in the case in which the line pattern of the scale 81 is 1/180 inch, the convex lenses 12A1 have pitches of 10 lpi (lens per inch; the number of the convex lenses 12A1 per inch), 20 lpi, 30 lpi, 45 lpi, 60 lpi, 90 lpi and 180 lpi (a pitch having a ratio of 1 to 18 as compared with the scale 81 having a line pattern at a pattern pitch of 180 dpi) in some cases. However, the pitch of the convex lens 12A1 is not restricted to the example but may be variously changed to be 100 lpi, 120 lpi or 130 lpi, for instance. Usually, the pitch of the convex lens 12A1 of the lens sheet 12 is not the accurate pitch due to a manufacturing error but is slightly shifted.

Moreover, the ink transmitting layer 12C is a portion to which an ink droplet ejected from a nozzle is first stuck and through which the stuck ink is transmitted. The ink transmitting layer 12C is formed by a material such as titanium, oxide, a silica gel, PMMA (a methacrylic resin), a binder resin, barium sulfate, a glass fiber or a plastic fiber. Furthermore, the ink absorbing layer 12B is a portion for absorbing and/or fixing the ink transmitted through the ink transmitting layer 12C. The ink absorbing layer 12B is formed by a material such as a hydrophilic polymer resin, for example, PVA (polyvinyl alcohol), a cation compound or particulates, for example, silica. One of the ink absorbing layer 12B and the ink transmitting layer 12C is a non-transparent member for transmitting a light therethrough and the other is a transparent member. Both of them may be members having a white color and transmitting a light therethrough or transparent members. Moreover, they can also be members through which a light is not transmitted if necessary.

Figure 3A:
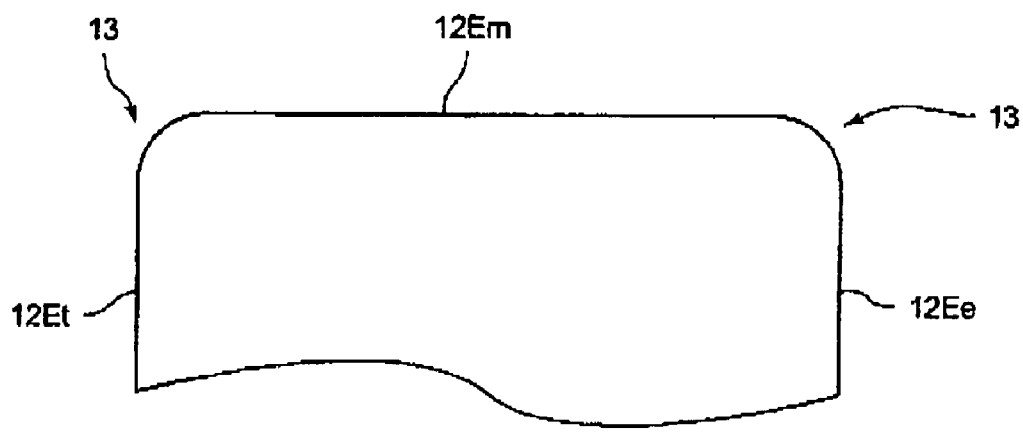
FIGS. 3A and 3B are partial enlarged views showing the lens sheet in FIG. 2.
Figure 3B:
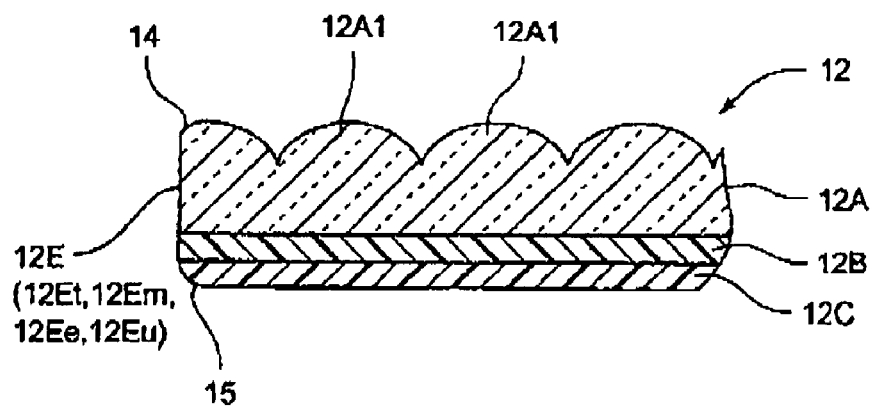

Furthermore, a sectional surface of the lenticular lens 12A is sharp. Therefore, there is a danger that hands or fingers of a handling person might be cut. For this reason, it is desirable to round off the sectional surface. More specifically, it is preferable that a portion 13 that a sheet end 12E intersects should be rounded (should be caused to be a circular arc) as shown in FIG. 3A or a rounded portion 14 should be provided on a surface side and the same rounded portion 15 should be provided on a back side in the sheet end 12E portion as shown in FIG. 3B. A slant face to be a taper may be provided in place of the roundness. Moreover, it is preferable that the rounded portion should be provided in the lenticular lens 12A portion. If at least one side of the surfaces (front and back faces) is rounded or tapered, however, it is possible to decrease the danger that the hands might be cut.

As another method of avoiding the danger that the hands might be cut, moreover, it is also possible to employ a method of constituting the lens sheet 12 by the lenticular lens 12A, the transparent film, the ink absorbing layer 12B and the ink transmitting layer 12C in this order and setting the transparent film to be slightly larger than the lenticular lens 12A.

Figure 2:
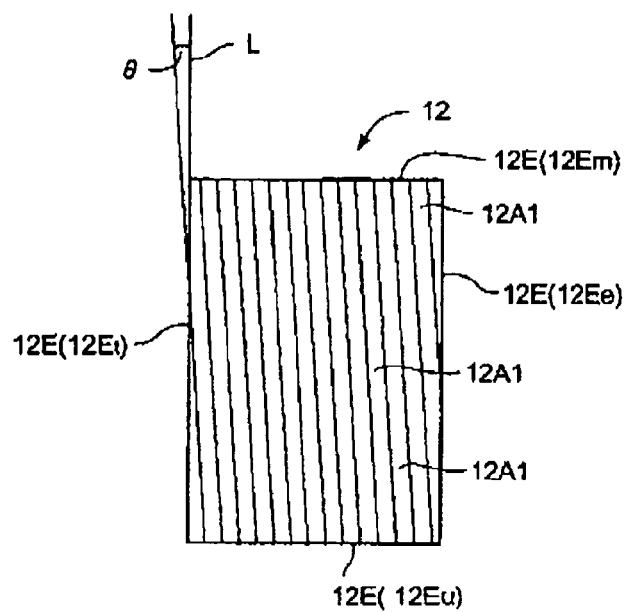
FIG. 2 is a plan view showing a schematic structure of a lens sheet to be printed by means of the printer according to the embodiment of the invention.

As shown in FIGS. 2, 3A and 3B, moreover, the lens sheet 12 according to the embodiment has an appearance taking a rectangular or square shape in a vertical direction thereof, and furthermore, a sheet end 12Et of the lens sheet 12 constituting the rectangular appearance (which is a sheet end in parallel with the sub scanning direction in a printing operation as will be described below and which will be hereinafter referred to as a sheet end in the sub scanning direction) is provided with an inclination to a longitudinal direction of the convex lens 12A1 (which corresponds to a transition direction). More specifically, the longitudinal direction of the convex lens 12A1 is not parallel with or perpendicular to an outer frame (each sheet end 12E) of the rectangular lens sheet 12 but is provided in an inclination state. The sheet end in the sub scanning direction has the sheet end 12Et on a print starting side and a sheet end 12Ee on a print ending side. In addition to the two sheet ends, moreover, the sheet end 12E is provided with sheet ends 12Em and 12Eu in positions in a longitudinal direction in order to link the sheet ends 12Et and 12Ee. A rectangular or square external shape is defined by these four sheet ends 12Et, 12Ee, 12Em and 12Eu in the vertical direction.

An inclination angle δ with respect to the sheet ends 12Et and 12Ee of the convex lens 12A1 is approximately 10 degrees in the embodiment. However, the inclination angle θ is not limited to 10 degrees. If the inclination angle θ is 5 to 15 degrees, a visibility of a parallax image corresponding to a parallax is enhanced. If the inclination is set within the range, moreover, a three-dimensional print is suitable. In the case in which the lens sheet 12 is inclined by 90 degrees to carry out an observation, a changing system print such as a motion print or a changing picture print is suitable. The sheet end 12Et is provided on a side at which a printing operation in the main scanning direction of the lens sheet 12 is started as described above.

<Referring to Whole Structure of Printer>

Figure 4:
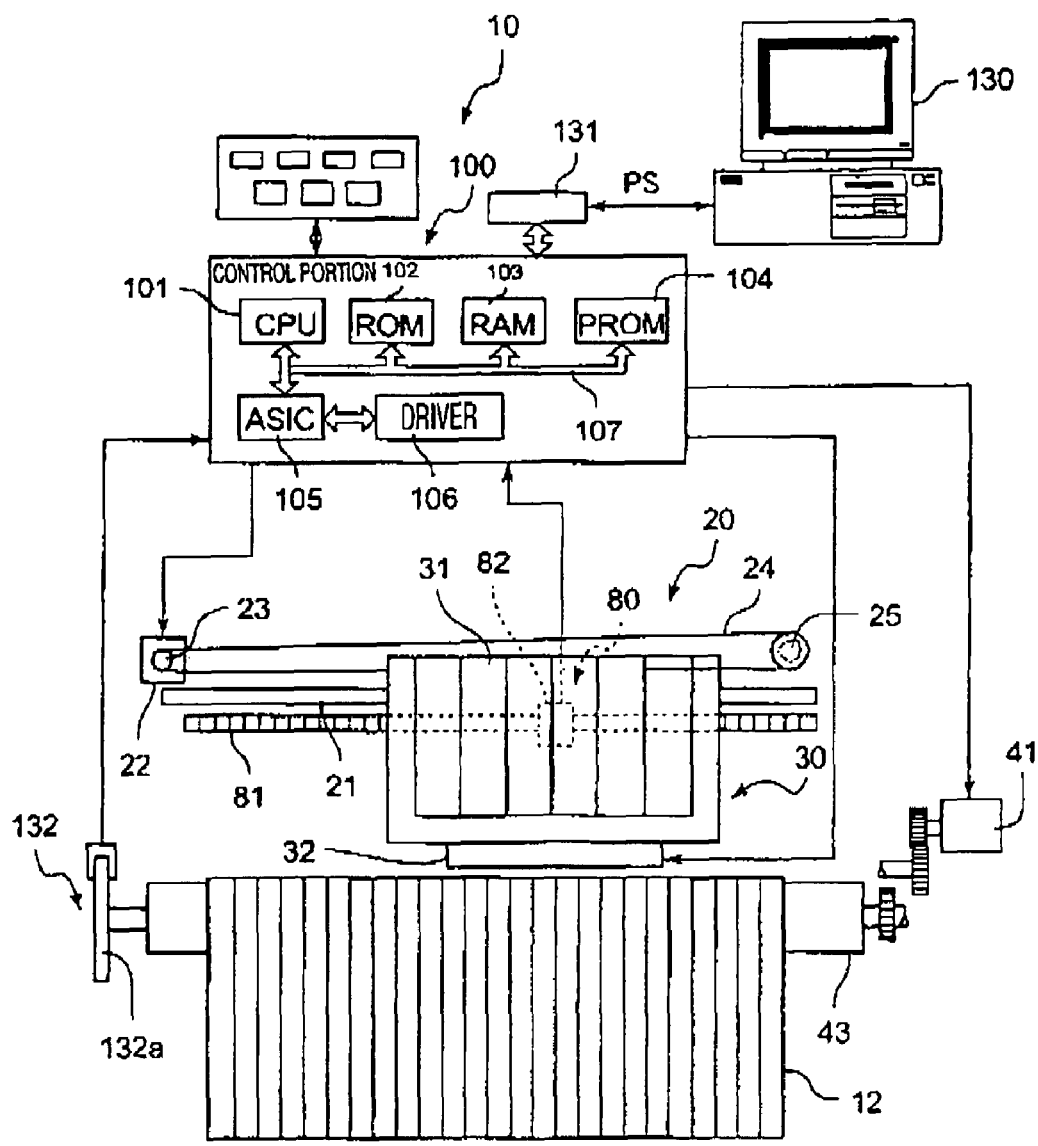
FIG. 4 is a schematic view showing a structure of the printer according to the embodiment of the invention.

As shown in FIG. 4, the printer 10 includes a carriage mechanism 20 for reciprocating a carriage 30 in a main scanning direction by means of a carriage motor (a CR motor 22) and a paper transport mechanism 40 for transporting the lens sheet 12 by means of a PF motor 41 (corresponding to a paper feeding motor). In addition, a control portion 100 shown in FIG. 4 is present.

Figure 5:
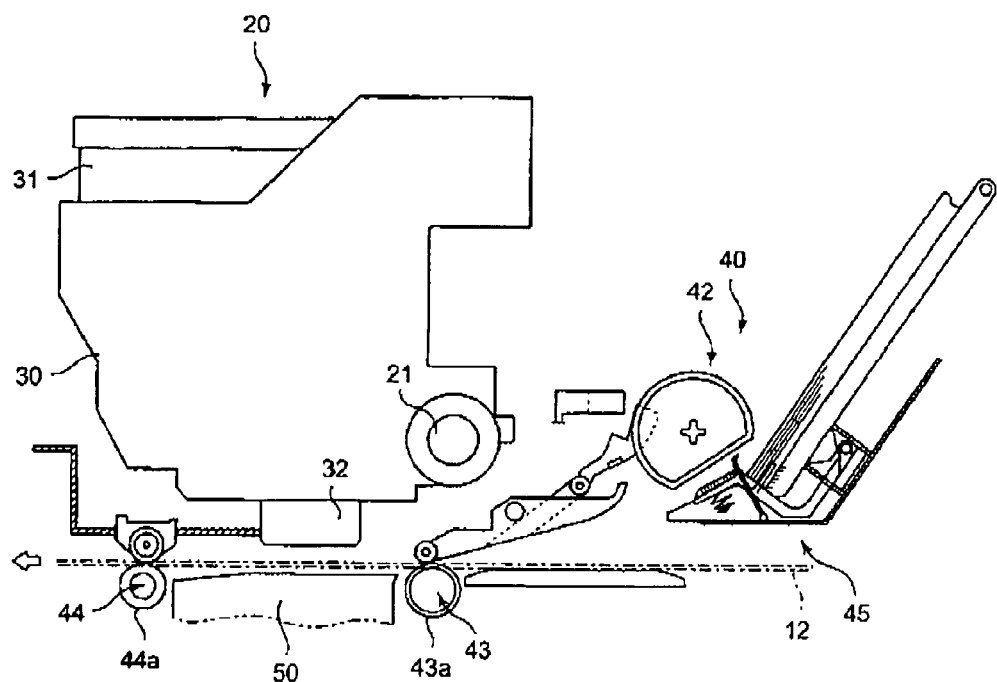
FIG. 5 is a side sectional view showing a portion related to a paper feed in the printer of FIG. 4.

Description will be given to the details of the carriage mechanism 20. The carriage mechanism 20 includes the carriage 30 as shown in FIGS. 4 and 5. Moreover, the carriage mechanism 20 includes a carriage shaft 21 for slidably holding the carriage 30, the carriage motor (the CR motor 22), a gear pulley 23 attached to the CR motor 22, a non-end belt 24, a follower pulley 25 for stretching the non-end belt 24 together with the gear pulley 23, and a linear encoder 80. It is also possible to additionally provide a rocking mechanism for rocking the carriage mechanism 20 to set the main scanning direction obliquely to the sub scanning direction (=a direction of a transport of the lens sheet 12).

Figure 6:
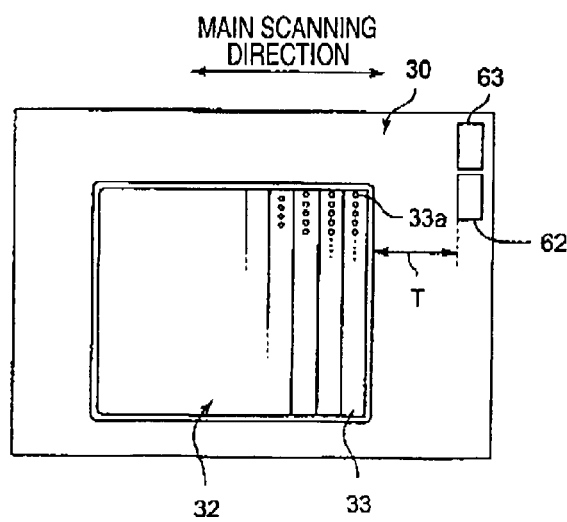
FIG. 6 is a bottom view showing a lower surface of a carriage in the printer of FIG. 4.
Figure 7:
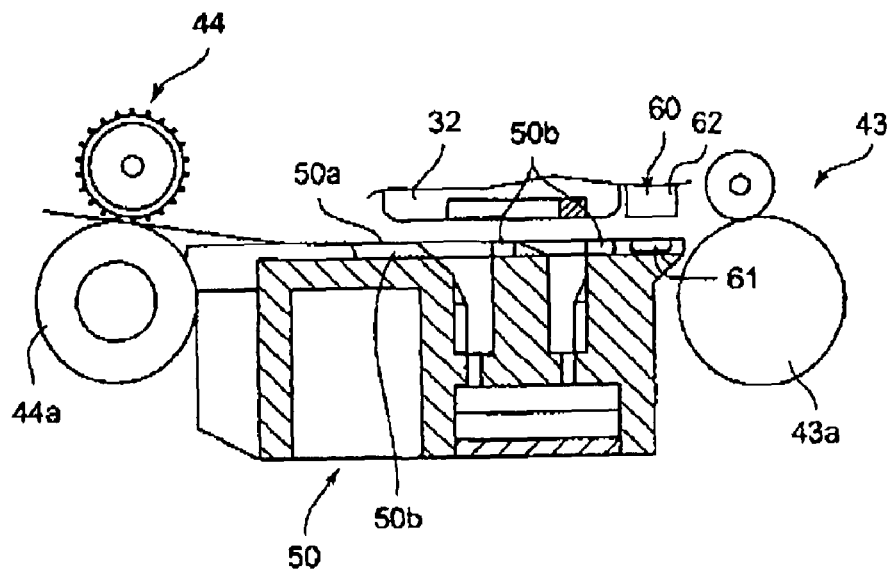
FIG. 7 is a side sectional view showing a shape in the vicinity of a platen in the printer of FIG. 4.

As shown in FIG. 5, the carriage 30 is provided in an opposite state to a platen 50. An ink cartridge 31 for each color is removably mounted on the carriage 30 as shown in FIG. 4. Moreover, a print head 32 is provided on a lower part of the carriage 30. As shown in FIG. 6, a nozzle 33a is disposed on the print head 32 in a line in the direction of the transport of the lens sheet 12 (the sub scanning direction), and a nozzle train 33 corresponding to an ink for each color is formed. In the embodiment, the nozzle train 33 is constituted by 180 nozzles 33a, for example, and a 180th nozzle 33a is positioned on a paper feeding side and a first nozzle 33a is positioned on a paper discharging side.

Moreover, a piezoelectric element (not shown) is disposed every nozzle 33a in the nozzle train 33 provided in the lower part of the carriage 30 and corresponding to each ink. By an operation of the piezoelectric element, an ink droplet can be ejected from the nozzle 33a disposed at an end of an ink passage. The print head 32 is not limited to a piezo driving type using the piezoelectric element but it is also possible to use a heater type for heating an ink by means of a heater and utilizing a force of a generated bubble, a magnetostrictive type using a magnetostrictive element, an electrostatic type utilizing an electrostatic force, a mist type for controlling a mist through an electric field and the other types.

As shown in FIG. 5, moreover, the printer 10 includes a paper transport mechanism 40. The paper transport mechanism 40 includes a PF motor 41 (see FIG. 4) for transporting the lens sheet 12, and a paper feeding roller 42 corresponding to a feed of a plain paper. Furthermore, a PF roller pair 43 for transporting and/or interposing the lens sheet 12 is provided on a paper discharging side of the paper feed roller 42. A driving force is transmitted from the PF motor 41 to a PF driving roller 43a in the PR roller pair 43 and the PF driving roller 43a can thus transport the lens sheet 12 every step.

In addition, the platen 50 and the print head 32 are disposed to be vertically opposed to each other on the paper discharging side of the PF roller pair 43. The platen 50 supports, from below, the lens sheet 12 transported to a lower side of the print head 32 by means of the PF roller pair 43. Moreover, the same paper discharge roller pair 44 as the PF roller pair 43 is provided on the paper discharging side of the platen 50. A driving force is transmitted from the PF motor 41 to a paper discharge driving roller 44a of the paper discharge roller pair 44 together with the PF driving roller 43a.

Moreover, an opening portion 45 is provided on a rear end side opposite to the paper discharging side and a lower side of the paper feed roller 42 in the printer 10. The opening portion 45 serves to cause a printing object which is hard to bend, for example, the lens sheet 12 to pass at the rear end side of the printer 10. The lens sheet 12 may singly pass through the opening portion 45, and furthermore, may pass in a mounting state on a tray.

Figure 8:
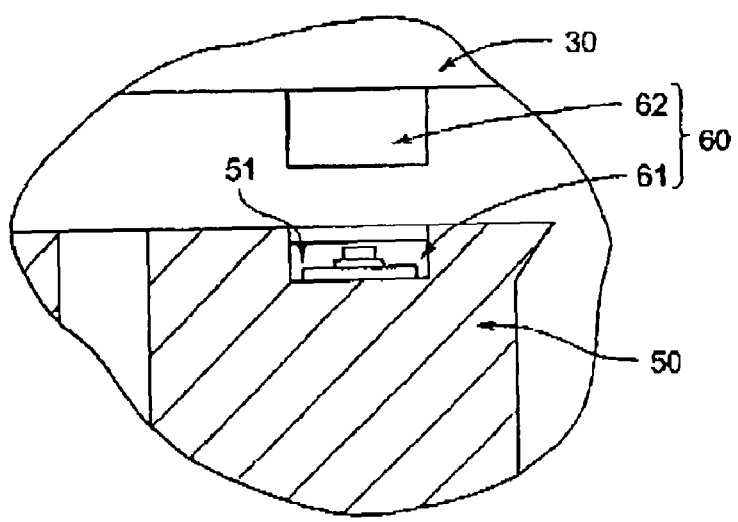
FIG. 8 is a side sectional view showing a structure of a lens detecting sensor in the printer of FIG. 4.

As shown in FIGS. 1 and 8, furthermore, a lens detecting sensor 60 for detecting a lens pitch (or a lens position) of the convex lens 12A1 in the lens sheet 12 is disposed in a portion between the lower surface of the carriage 30 and the platen 50. The lens detecting sensor 60 is of a light transmitting/receiving type (a transmitting type), and includes a light emitting portion 61 and a light receiving portion 62 as shown in FIGS. 1 and 8. The light emitting portion 61 is provided on the platen 50 side (a lower side) of the lens sheet 12 to be transported. Moreover, the light receiving portion 62 is provided on the carriage 30 side (an upper side) of the lens sheet 12 to be transported. A portion in which the light emitting portion 61 is to be provided is not restricted to the platen 50 but may be disposed in other fixed portions, and furthermore, may be provided on a front end side of the platen 50. Thus, the light emitting portion 61 is provided on a rear end side of the platen 50 so that the light emitting portion 61 and the light receiving portion 62 which will be described below are opposed to each other.

The light emitting portion 61 includes a large number of light emitting diodes (LEDs). Some LEDs emit lights having various wavelengths such as a visible light or an infrared light. It is preferable to use an infrared LED for emitting the infrared light in the case in which a dazzle is to be reduced.

In addition, the light emitting portion 61 is provided in a concave portion 51 present on the rear end side of the platen 50. The concave portion 51 is concaved from the other portions of the platen 50. The concave portion 51 is provided in a state to have a certain depth or more in such a manner that a light source group 611 (a light source 612) can be separated from a diffusing plate 613 by a certain distance.

As described above, moreover, the light source group 611 has a large number of light sources 612 arranged in the main scanning direction. Furthermore, the light sources 612 are arranged at a predetermined interval and are provided in such a state as to be separated from the lens sheet 12 at a certain interval in consideration of a directivity of the light source 612. Consequently, a light emitted from the light source 612 is irradiated with a slight extension with respect to the diffusing plate 613. Moreover, the diffusing plate 613 variously changes a direction of an advance of the light emitted from the light source 612. Consequently, the light passing through the diffusing plate 613 is emitted toward the lens sheet 12 in a state in which a contrast is made uniform.

In the embodiment, the light source group 611 having the light sources 612 arranged is provided to be larger than a specified width of the lens sheet 12. For this reason, the light source group 611 is provided in such a manner that a great difference is not made on a contrast of a light incident on the lens sheet 12. In the case in which the contrast of the light is to be reduced still more, moreover, it is also possible to change the arrangement of the light sources 612 constituting the light source group 611 to arrange the light sources 612 in a staggered manner.

As shown in FIG. 6, for example, the light receiving portion 62 is fixed to the lower surface of the carriage 30, and furthermore, is attached to a portion separated from a home position in the main scanning direction at a paper feeding side in the sub scanning direction. However, a position in which the light receiving portion 62 is to be attached is not restricted to the same portion and it is also possible to employ a structure in which the light receiving portion 62 may be attached to a central part in the main scanning direction in the lower surface of the carriage 30, for example.

In the embodiment, the light receiving portion 62 includes a base portion 621, a light receiving unit 623 and a slit plate 624. The base portion 621 is a portion to which the light receiving unit 623 is attached, and has a housing portion 622 for attaching the light receiving unit 623 thereto. The housing portion 622 is set into such a state that all sides are surrounded by a plate-shaped member. The light receiving unit 623 is attached to the housing portion 622 surrounded by the plate-shaped member and only the lower surface side is opened. Consequently, a certain diffused light can be prevented from being received.

Moreover, the light receiving unit 623 is an element capable of converting a received light into an electric signal, for example, a phototransistor, a photodiode or a photo IC. Furthermore, the slit plate 624 is attached to the lower surface side of the housing portion 622. A slit 624a for permitting a passage of a light is formed on the slit plate 624 so that a light in a predetermined direction can be received through the slit 624a (a light in a direction along an optical axis L in FIG. 1).

It is desirable that a width of the slit 624a should be equal to or smaller than a half of a lens width of the convex lens 12A1. In the case in which the width of the slit 624a is too small, however, a gap between the platen 50 and the carriage 30 is regulated severely so that there is a possibility that an excellent detection might not be carried out. For this reason, it is necessary to set the width of the slit 624a to be equal to or greater than a certain dimension value. Moreover, a light irradiated on a portion of the slit plate 624 other than the slit 624a is intercepted by the slit plate 624. By the structure, a diffused light other than that in the direction along the optical axis L can be prevented from being received by the light receiving unit 623.

Moreover, it is also possible to employ a structure in which the slit plate 624 is not provided. In this case, precision in the detection of the lens pitch in the light receiving unit 623 is deteriorated. By a light collecting function of each convex lens 12A1, however, it is possible to detect the lens pitch of the lens sheet 12.

In the embodiment, moreover, the light receiving portion 62 does not come in contact with the lens sheet 12 in a state of a transport of the lens sheet 12, and is disposed to approach the lens sheet 12 so as not to deteriorate a transport property. Consequently, a light emitted from the light emitting portion 61 is diffused by setting a curvature center of each convex lens 12A1 in the boundary surface Q to be a focal point. However, the light is incident on the light receiving portion 62 in a small diffusing state.

In the case in which the light emitting portion 61 employs a direct downward type shown in FIG. 1, the structure is not restricted to the arrangement of a large number of light emitting diodes but a line-shaped light source for setting the main scanning direction to be a longitudinal direction maybe used. For the line-shaped light source, more specifically, it is possible to use a cathode fluorescent lamp (CFL), a cold cathode fluorescent lamp (CCFL) or an electro luminescence (EL). For the light emitting portion 61, moreover, it is also possible to use a laser oscillator or a lamp which can generate a laser beam, for example, a visible light or an infrared light.

For the light emitting portion, moreover, it is also possible to employ a structure of an edge light type in place of the direct downward type. In this case, it is preferable that the light emitting portion should have a light source disposed on an end in the main scanning direction, a reflector for reflecting a light of the light source toward the main scanning direction side, a light guide plate for causing a light to advance in an inner part and setting the main scanning direction to be a longitudinal direction, a reflecting member attached to lower surface and side surface sides of the light guide plate and the other end side in the longitudinal direction of the light guide plate and serving to reflect a light, a diffusing film for diffusing a light emitted toward an upper surface side, and a reflecting dot disposed on the lower surface of the light guide plate and serving to diffuse a light.

Figure 9:
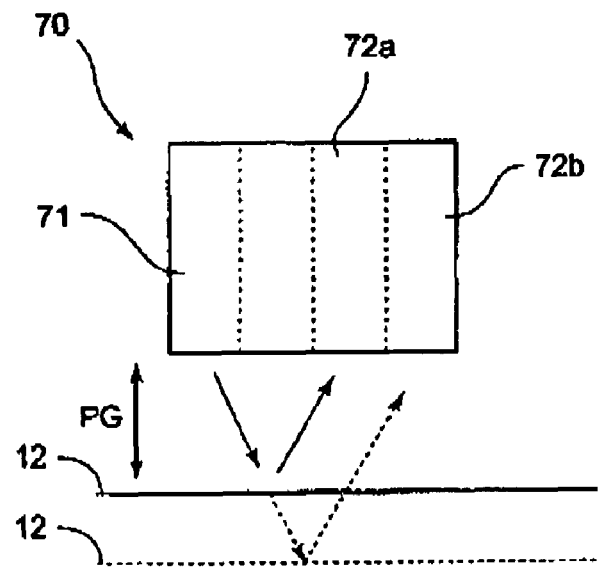
FIG. 9 is a typical view showing a structure of a gap sensor in the printer of FIG. 4.

Furthermore, it is preferable that a gap detecting sensor 70 should be present in addition to the lens detecting sensor 60 on the lower surface of the carriage 30 in order to measure a distance PG between the lens sheet 12 and the nozzle 33a. FIG. 9 is an explanatory view showing the gap detecting sensor 70 for detecting the distance PG. As shown in FIG. 9, the gap detecting sensor 70 has a light emitting portion 71 and two light receiving portions (a first light receiving portion 72a and a second light receiving portion 72b). The light emitting portion 71 has a light emitting diode and irradiates a light on the lens sheet 12. The first light receiving portion 72a and the light receiving portion 72b have light receiving units for outputting an electrical signal corresponding to an amount of a received light, respectively. The second light receiving portion 72b is provided in a more distant position from the light emitting portion 71 as compared with the first light receiving portion 72a.

The light emitted from the light emitting portion 71 is irradiated on the lens sheet 12, and furthermore, is reflected. The reflected light is incident on the light receiving unit and is converted into an electrical signal corresponding to an amount of the incident light in the light receiving unit. In the case in which the distance PG is small, the light reflected by the lens sheet 12 is mainly incident on the first light receiving portion 72a and only a diffused light is incident on the second light receiving portion 72b. Accordingly, an output signal of the first light receiving portion 72a is larger than that of the second light receiving portion 72b.

On the other hand, in the case in which the distance PG is great, the reflected light is mainly incident on the second light receiving portion 72b and only a diffused light is incident on the first light receiving portion 72a. Accordingly, the output signal of the second light receiving portion 72b is greater than that of the first light receiving portion 72a. For this reason, by previously obtaining a relationship between a ratio of the output signals of the first light receiving portion 72a and the second light receiving portion 72b and the distance PG, it is possible to detect the distance PG corresponding to the lens sheet 12 based on the ratio of the output signals. In this case, it is preferable that information about the relationship between the ratio of the output signals of the light receiving portions 72a and 72b and the distance PG should be stored as a table in an ROM 102 or a nonvolatile memory 104.

The detection of the output signals is carried out while driving the carriage 30 in the main scanning direction. In the driving operation, it is possible to detect the distance PG in the main scanning direction of the lens sheet 12 by corresponding to a detection of a position of the linear encoder 80 which will be described below.

The gap detecting sensor 70 can also be used as the lens detecting sensor 60. In this case, by carrying out a disposition in such a manner that the optical axis of the light emitting portion 61 is inclined and changing the ratio of the output signals between the first light receiving portion 72a and the second light receiving portion 72b corresponding to the distance PG, it is possible to use the gap detecting sensor 70 as the lens detecting sensor 60.

As shown in FIG. 4, moreover, the carriage mechanism 20 is provided with the linear encoder 80 corresponding to a position detecting unit. The linear encoder 80 has the scale 81 in which a line pattern including a black print portion and a transparent portion for transmitting a light therethrough is repeated, and a linear sensor 82 for outputting a light toward the scale 81 and converting a light reflected from the scale 81 into an electrical signal (an encoder signal which will be hereinafter referred to as an ENC signal) to transmit the electrical signal to the control portion 100.

Figure 18:
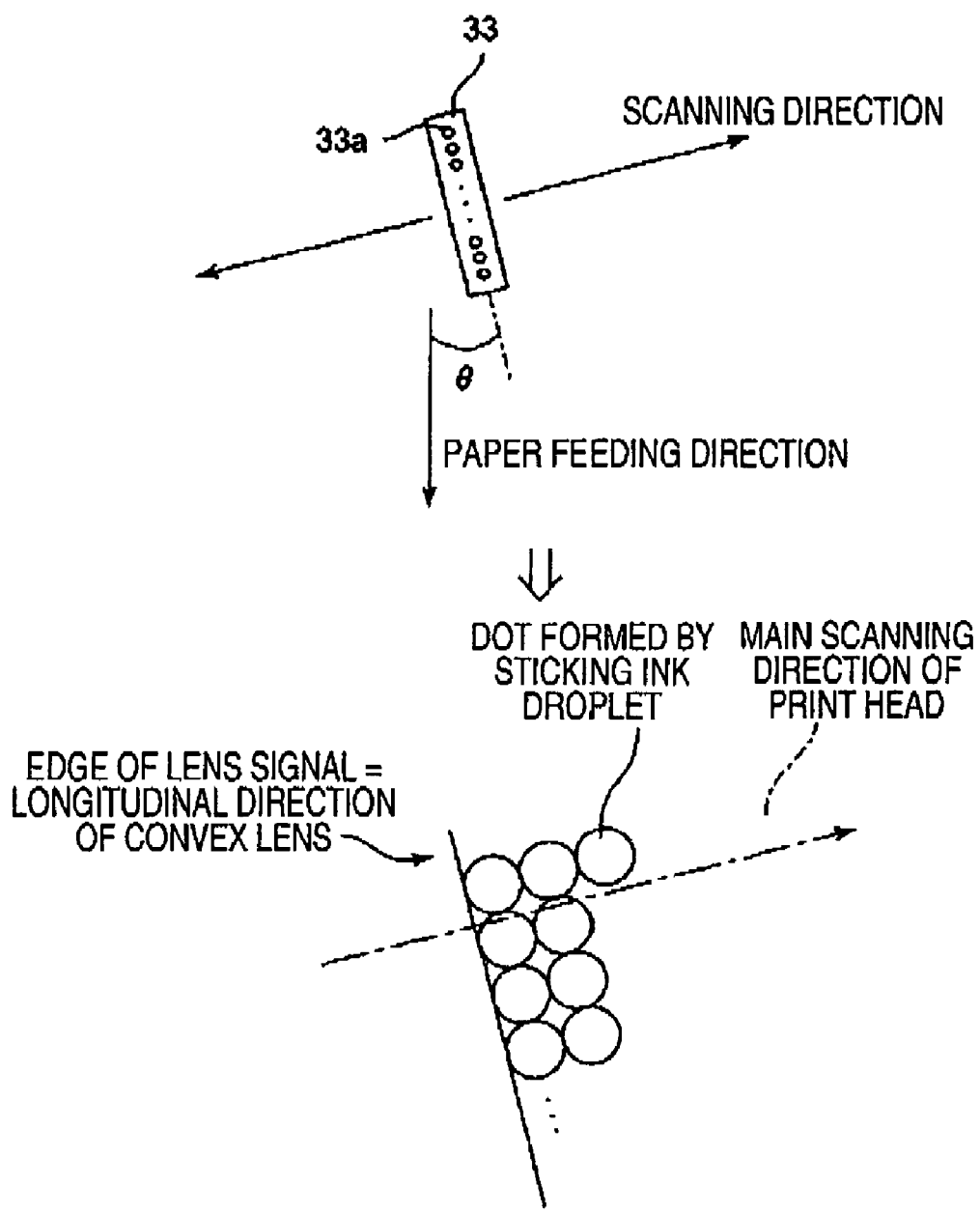
FIG. 18 is a view showing a state of a dot formation in a rocking mechanism in the case in which the same rocking mechanism is provided in the printer of FIG. 4.
Figure 19:
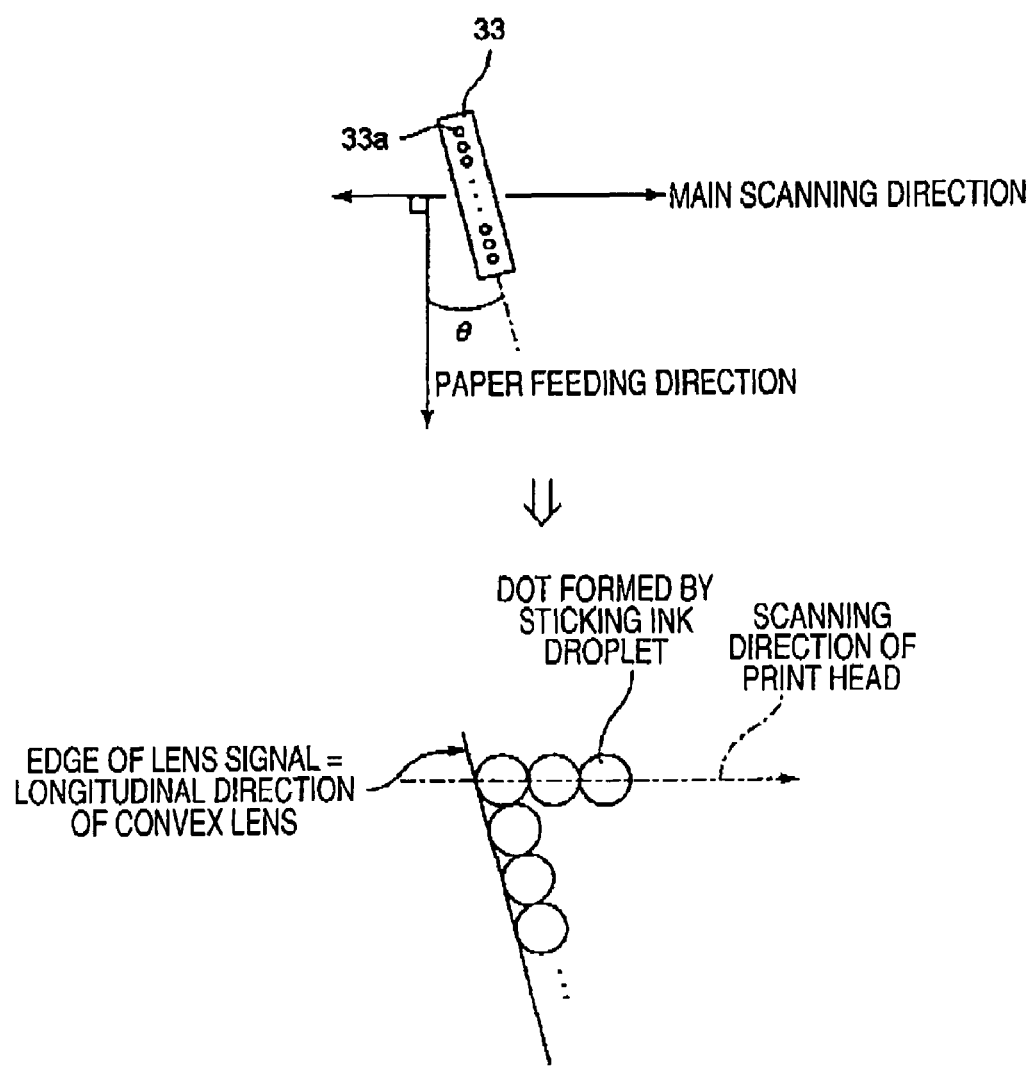
FIG. 19 is a view showing a state of a dot formation in another rocking mechanism in the case in which the same rocking mechanism is provided in the printer of FIG. 4.

In the embodiment, the carriage mechanism 20 is not provided with a rocking mechanism for rocking the carriage shaft 21 corresponding to a support shaft but may be provided with the rocking mechanism. More specifically, a driving operation may be carried out in a direction having an angle exceeding 90 degrees with respect to the sub scanning direction while inclining the print head 32 itself as shown in FIG. 18 or inclining only the print head 32 as shown in FIG. 19.

<Referring to Structure of Signal Forming Portion and Summary of Signal Processing>

Figure 10:
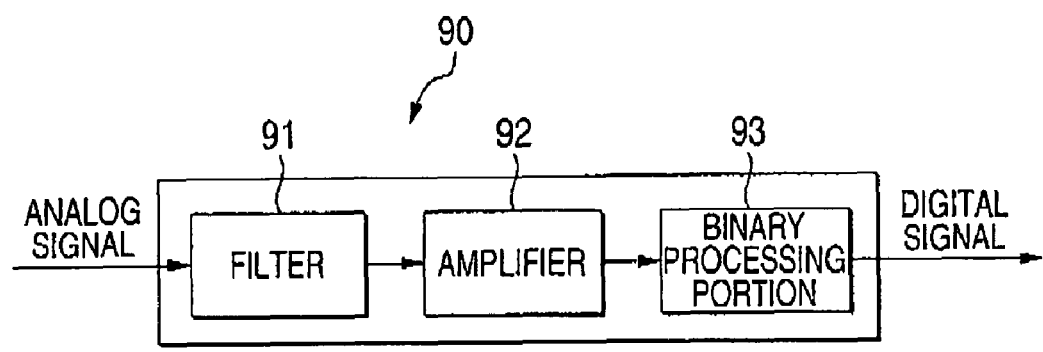
FIG. 10 is a block diagram showing a structure of a signal output portion in the printer of FIG. 4.
Figure 11:
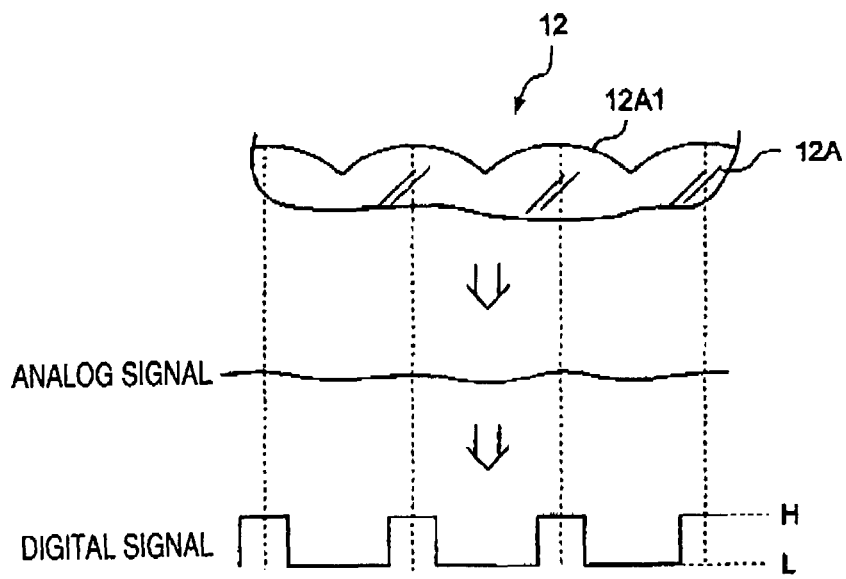
FIG. 11 is a diagram showing an analog signal and a digital signal for a lens pitch detection which is executed by the printer in FIG. 4.

Next, description will be given to a structure of a signal forming portion 90. As shown in FIG. 10, the signal forming portion 90 includes a filter 91, an amplifier (AMP) 92, and a binary processing portion 93. The filer 91 is connected to one end side of a signal line 94. The other end side of the signal line 94 is connected to the light receiving portion 62 (the light receiving unit 623). For this reason, an analog signal generated in the light receiving portion 62 is transmitted to the filter 91 through the signal line 94. In the filter 91, however, a frequency component other than that in a predetermined band of the analog signal (see FIG. 11) is removed. Consequently, a digital signal (a lens signal corresponding to a detection signal) shown in FIG. 11 is generated.

Moreover, the signal passing through the filter 91 is input to the AMP 92 and is amplified into a predetermined voltage (40 times as an example). The signal thus amplified is subsequently input to the binary processing portion 93, and the input signal is set to be a binary signal having an H level or an L level depending on whether a threshold is exceeded or not. By inputting the binary signal to the control portion 100 which will be described below and detecting a switching timing of the signal having the H level and/or the signal having the L level in this state, it is possible to measure the lens pitch of the lens sheet 12.

<Referring to Control Portion of Printer>

Next, description will be given to the control portion 100. The control portion 100 is a portion for carrying out various control operations and corresponds to a control unit and a deciding portion, and inputs signals output from the lens detecting sensor 60, a lens sheet detecting sensor 63 for detecting a lens sheet (see FIG. 6), the cap detecting sensor 70, the linear sensor 82, a rotary encoder 132 which will be described below, and a power SW for turning ON/OFF a power supply of the printer 10. As shown in FIG. 4, the control portion 100 includes a CPU 101, the ROM 102 for storing various programs, an RAM 103 for temporarily storing data, the nonvolatile memory (PROM) 104, an ASIC 105 and a head driver 106, and they are connected to each other through a bus 107. By adding a circuit for carrying out their cooperation or peculiar processings, it is possible to implement a processing flow which will be described below.

Figure 12:
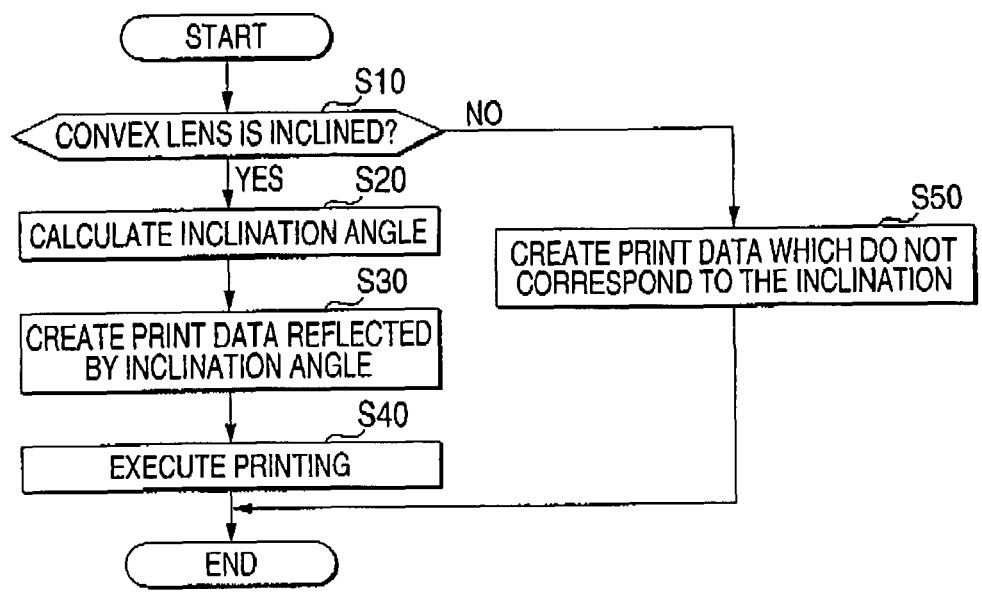
FIG. 12 is a flowchart showing a basic processing for carrying out a printing operation which is to be executed by the printer in FIG. 4.
Figure 14:
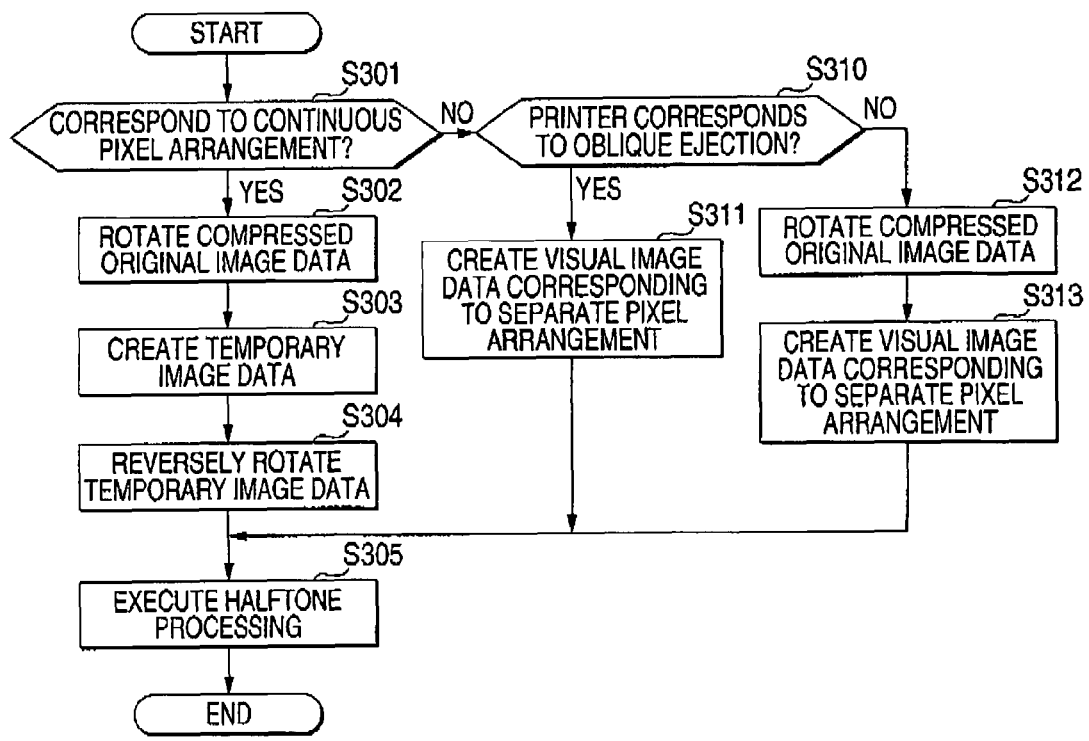
FIG. 14 is a flowchart showing a processing for creating print data which is to be executed by the printer in FIG. 4.
Figure 17:
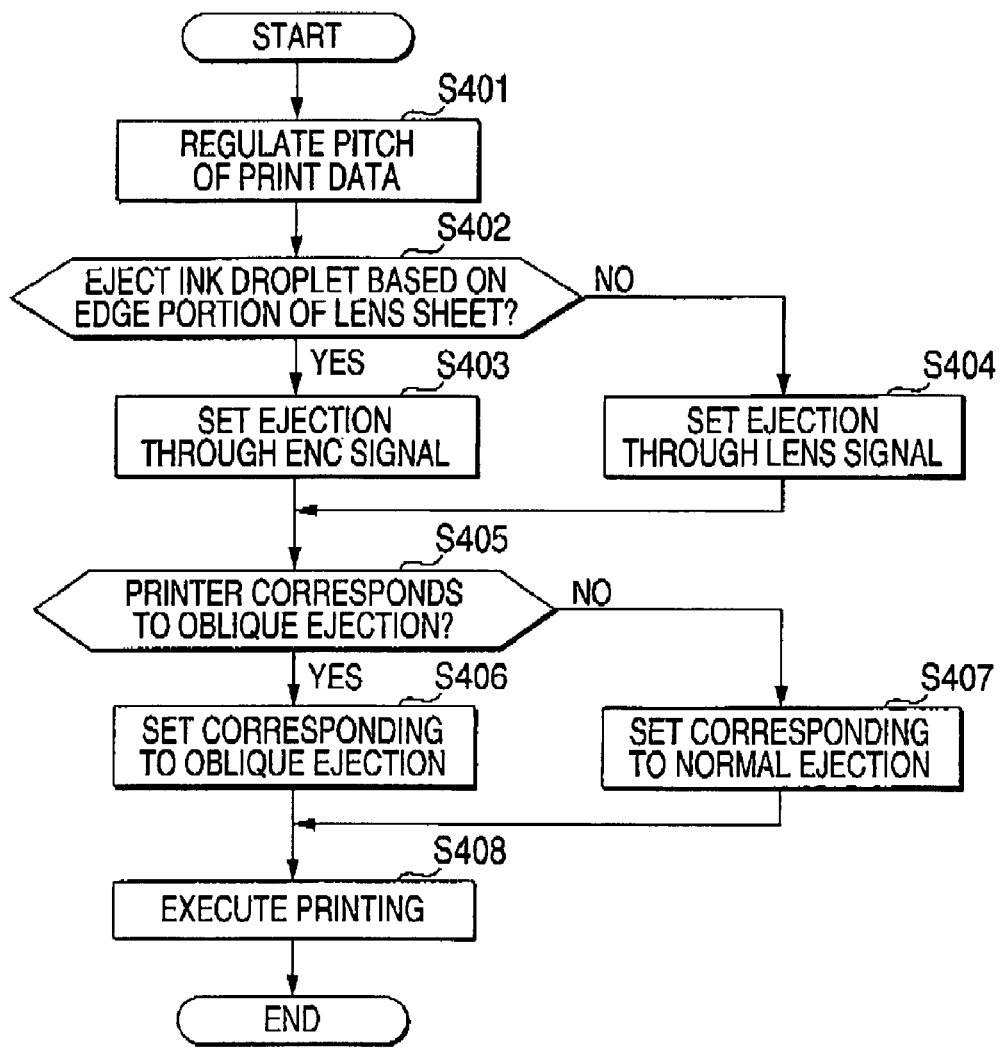
FIG. 17 is a flowchart showing a processing for executing the printing operation in the printer of FIG. 4.

The following structure for executing processing flows in FIGS. 12, 14 and 17 may be implemented in hardware or software.

As shown in FIG. 4, moreover, the printer 10 includes an interface 131 to be connected to the control portion 100. The printer 10 is connected to a computer 130 through the interface 131. Furthermore, the printer 10 includes the rotary encoder 132. The rotary encoder 132 has a disk-like scale 132a differently from the linear encoder 80. However, the other structures are the same as those in the linear encoder 80.

<Referring to Basic Processing Flow for Carrying Out Printing>

By using the printer 10 having the structure, a basic processing flow for carrying out printing over the lens sheet 12 will be described below with reference to FIG. 12.

In a state in which the printer 10 is ON, it is first decided whether the convex lens 12A1 of the lens sheet 12 is inclined or not (Step S10 corresponding to an information acquiring step). By carrying out the decision, it is determined whether or not print data which will be described below are to be created corresponding to the inclination of the convex lens 12A1 (the longitudinal direction of the convex lens 12A1 is inclined to the sub scanning direction or not) or whether or not the longitudinal direction of the convex lens 12A1 is provided along the sub scanning direction as in a normal printing operation to be carried out over the lens sheet 12. If the decision is Yes (the longitudinal direction of the convex lens 12A1 is inclined), the processing proceeds to Step S20. If the decision is No (the longitudinal direction of the convex lens 12A1 is provided along the sub scanning direction), moreover, the processing proceeds to Step S50 which will be described below.

Figure 13A:
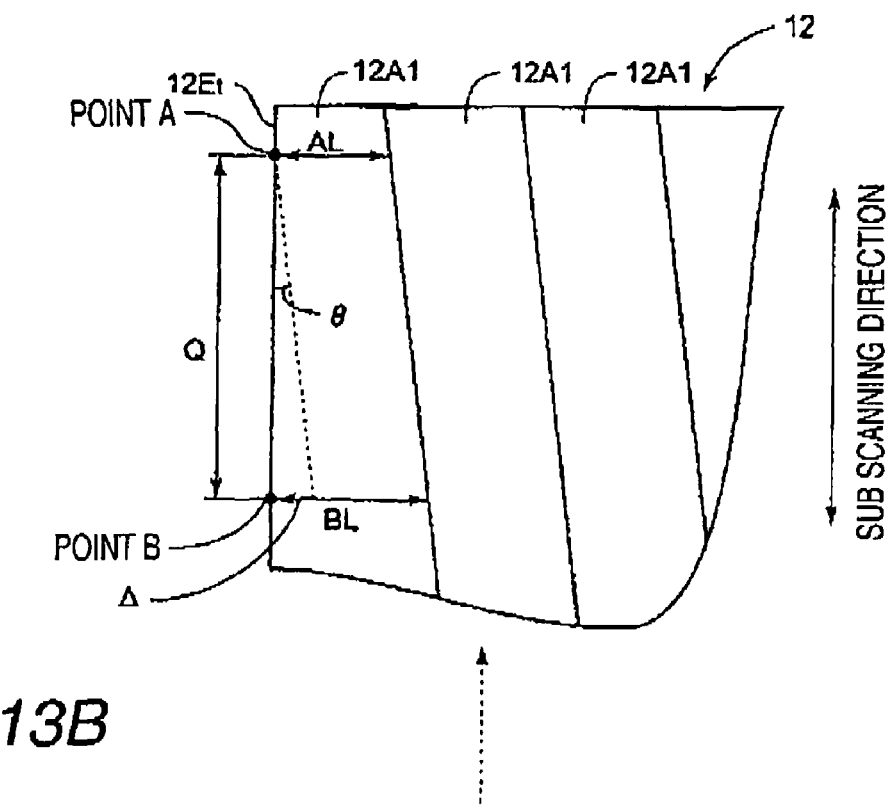
FIGS. 13A and 13B are diagrams showing a lens signal together with the description of a calculation of an inclination angle which is to be executed by the printer in FIG. 4.
Figure 13B:
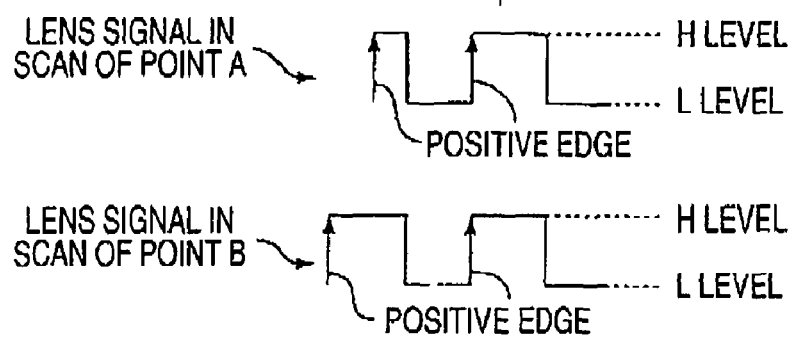

If the decision is Yes at the Step S10, a processing of calculating an inclination angle (the inclination angle θ in FIG. 2) is subsequently carried out (Step S20). In the calculation, a distance 4 between a point A and a point B provided apart from the point A by a predetermined distance in the sub scanning direction is measured as shown in FIGS. 13A and 13B, for example. Moreover, there are measured a distance AL to a dent portion present in a rightward or leftward adjacent part (the rightward adjacent part in FIG. 13A) to the point A on a straight line in a perpendicular direction to the sub scanning direction, that is, a transverse direction of the convex lens 12A1 and a distance BL to the dent portion present in a rightward or leftward adjacent part (the rightward adjacent part in FIG. 13A) to the point B in the transverse direction. After the measurement of the distances AL and BL and the distance Q is ended, the inclination angle θ is subsequently calculated. In the case in which "θ" is represented by a degree, the inclination angle δ is calculated by θ=ATAN(Δ/Q)×180/π. Δ represents a difference between the distances BL and AL. As described above, the inclination angle θ of the convex lens 12A1 is calculated.

After the calculation of the inclination angle θ, information about the inclination angle θ is reflected to carry out a processing of creating print data to be printed (Step S30; subsequent steps correspond to a printing step to be carried out till Step S50). When the print data are created by the processing, a printing operation is executed (Step S40). If the decision of the Step S10 is No (the longitudinal direction of the convex lens 12A1 is set along the sub scanning direction) moreover, there is carried out a processing of creating the print data in a state in which the convex lens 12A1 is not inclined (Step S50).

At the Step S50, a calculation of an image size in visual image data obtained after converting a resolution and synthesizing a plurality of original image data (usually, a compression of the original image data) is carried out in accordance with a lens resolution (the number of the convex lenses 12A1), a print resolution and a print size. Next, a pixel number R in the individual convex lens 12A1 is obtained. The pixel number R corresponds to the number of dots which can be formed in each convex lens 12A1. Then, a pixel number (a dot number) L per image data in each convex lens 12A1 is obtained. The pixel number L is obtained by dividing the dot number L by the number of the original image data. As described above, the resolution is converted and the conversion of the resolution is carried out for the respective original image data. The compressed original image data subdivided after the conversion of the resolution are arranged and disposed in determined order (order of a visual angle). Consequently, there are created strap-shaped subdivided image data disposed in one convex lens 12A1.

Moreover, the subdivided image data thus created are disposed in order of the arrangement in a short direction of the convex lens 12A1 so that visual image data reflected by information about a plurality of original image data are created. Then, a color conversion processing is executed so that color components represented by R, G and B systems of visual image data are converted into color components of cyan (C), magenta (M), yellow (Y) and black (K) systems which can be printed by the printer 10 and/or can be represented. Furthermore, a halftone processing is carried out over the visual image data subjected to the color conversion. The halftone processing serves to subtract a gradation value of the original image data (256 gradations in the embodiment) into a gradation value which can be represented every pixel by the printer 10. The "subtraction color" implies that the number of gradations representing the color is decreased. More specifically, referring to a recording rate table, the subtraction color into four gradations including "no formation of dots", "a formation of small dots", "a formation of middle dots" and "a formation of large dots" is carried out, for example. In the halftone processing, a dot distribution processing is carried out by using a technique such as an error diffusing method or a dither method.

Furthermore, there is executed a processing of generating print data from image data subjected to the halftone processing. The print data include raster data indicative of a recording state of a dot in each primary scan and data indicative of an amount of a sub scanning feed and are created with reference to distribution data in a distribution table. The print data are mirror image inverted with respect to normal print data. This is the basic processing flow to be carried out in the printing operation of the printer 10.

<Referring to Print Data Creation Processing Flow in the Case in which Convex Lens 12A1 is Inclined>

With reference to FIG. 14, description will be given to the processing of creating the print data which is to be carried out at the Step S30 if it is decided that the convex lens 12A1 is inclined in the decision at the Step S10 (Yes).

Figure 15:
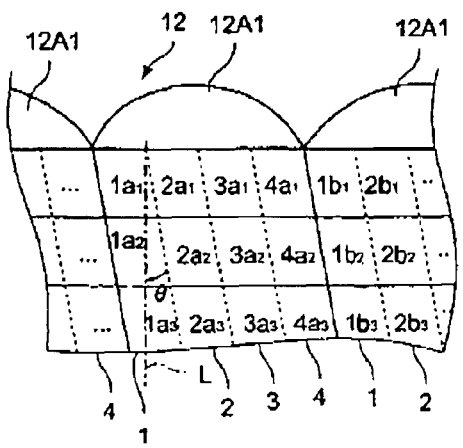
FIG. 15 is a view showing a continuous pixel arrangement printed by the printer in FIG. 4, illustrating a data array thereof.
Figure 16:
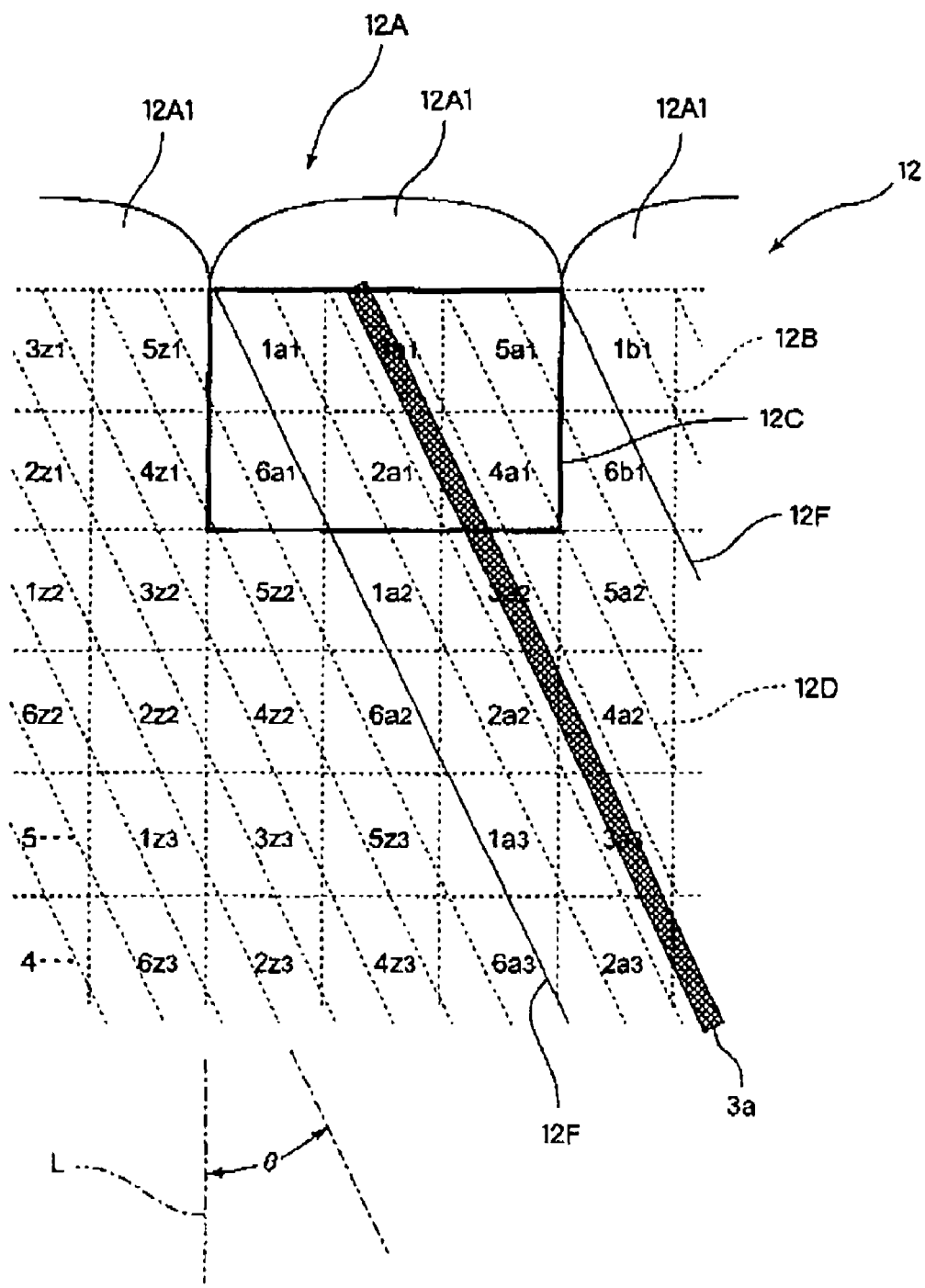
FIG. 16 is a view showing a separate pixel arrangement printed by the printer in FIG. 4, illustrating a data array thereof.

First of all, it is decided that the print data to be created correspond to a continuous pixel arrangement or a separated pixel arrangement (Step S301). The continuous pixel arrangement indicates a state in which image data constituting compressed original image data obtained by compressing original image data corresponding to each parallax are disposed continuously (in a row) in the longitudinal direction of the convex lens 12A1 as shown in FIG. 15. On the other hand, the separate pixel arrangement indicates a state in which a pixel constituting the compressed original image data corresponding to each parallax is disposed in the longitudinal direction of the convex lens 12A1 and is not continuous (in a row), and is disposed in a state in which other pixel data are interposed for a separation as shown in FIG. 16. It is also possible to decide whether the print data are caused to correspond to the continuous pixel arrangement or the separate pixel arrangement depending on the number of original image data (the number of parallaxes). However, it is also possible to make the decision depending on other elements such as picture quality.

In the continuous pixel arrangement shown in FIG. 15, pixels of four images 1, 2, 3 and 4 are disposed one-dimensionally. More specifically, a pixel 1a1 of the image 1, a pixel 2a1 of the image 2, a pixel 3a1 of the image 3 and a pixel 4a1 of the pixel 4 are arranged and disposed in a line in the main scanning direction, and furthermore, subsequent pixels 1a2, 2a2, 3a2, 4a2, . . . are also extended in the sub scanning direction with the same relationship maintained. One partial parallax image in one convex lens 12A1 is formed by the pixel 1a system and one subdivided parallax image is formed by the pixels 1a system, 1b system, . . . .

In the separate pixel arrangement shown in FIG. 16, pixels of six images 1, 2, 3, 4, 5 and 6 are disposed two-dimensionally. More specifically, a pixel 3a1 of the image 3 is disposed in a rightward adjacent part to the pixel 1a1 of the image 1, a pixel 5a1 of the pixel 5 is disposed in a rightward adjacent part to the pixel 3a1, a pixel 6a1 of the image 6 is disposed in the sub scanning direction of the pixel 1a1 of the image 1 (a lower side in FIG. 16), a pixel 2a1 of the image 2 is disposed in a rightward adjacent part to the pixel 6a1, and a pixel 4a1 of the image 4 is disposed in a rightward adjacent part to the pixel 2a1. Also in this case, one partial parallax image in one convex lens 12A1 is formed by the pixel 1a system, and one subdivided parallax image is formed by the pixels 1a system, 1b system, . . . . In the drawing, a partial parallax image of the pixel 3a system is shown in an oblique line. A small square portion 12B shown in a thick dotted-line indicates a parallax image arrangement region a parallax region), a thick solid line portion 12C indicates a parallax region corresponding to the number of parallaxes (which will be hereinafter referred to as a parallax region), and a thin dotted-line portion 12D extended obliquely indicates an image line of a parallax boundary. Moreover, a solid line portion 12F extended obliquely indicates a physical boundary of each convex lens 12A1.

The number of original image data which can be visually observed (disposed) in the separate pixel arrangement is larger than that in the continuous pixel arrangement shown in FIG. 15. More specifically, the number of parallaxes is easily increased. This is an advantage of a two-dimensional arrangement. In both the separate pixel arrangement and the continuous pixel arrangement, a rotation of the lens sheet 12 in the visual observation sets a reference direction L to be a reference (the direction corresponds to a direction of a reference axis and a direction of a rotating axis) and a user's eyes also set the reference direction L to be a reference.

In the separate pixel arrangement, in the case in which the lens sheet 12 is rotated continuously, a pixel in an arrangement in a matrix is continuously switched as the pixel to be visually observed, for example. In the embodiment, moreover, a pattern to be visually observed through the lens sheet 12 by the user corresponds to a three-dimensional image.

For this reason, the respective pixels approximate to each other. By employing the separate pixel arrangement, similarly, the user can visually observe the pattern well. Even if the image to be visually observed is not the three-dimensional image but an image (animation) moving with a change in an observation angle, similarly, the user can visually observe the image well. The reason is as follows. Also in the separate pixel arrangement, for example, all of the pixels 1a, 1b, . . . , the pixels 2a, 2b, . . . and the pixels 3a, 3b, . . . have the same angle with respect to the reference direction L as shown in FIG. 16.

If the decision is Yes at the Step S301 (corresponding to the continuous pixel arrangement), a processing of rotating the compressed original image data is subsequently carried out (Step S302). In the rotation processing, a processing of rotating the compressed original image data is carried out corresponding to the inclination angle θ which is detected at the Step S20. Next, temporary image data corresponding to the continuous pixel arrangement are created (Step S303). In this case, the respective compressed original image data subjected to the rotation processing are subdivided corresponding to the lens pitch of the convex lens 12A1 in a direction corresponding to a paper feeding direction. Prior to the subdivision, in the embodiment, a resolution conversion processing is carried out to obtain the respective compressed original image data through the compression of the image data for the original image data. Then, strap-shaped subdivided image data are created from the compressed original image data. Subsequently, the strap-shaped subdivided image data are disposed in order to be switched in a visual observation. Thus, temporary image data can be obtained.

Subsequently, there is carried out a reverse rotation processing of rotating the temporary image data created at the Step S303 by the same rotating angle θ in a reverse direction to that in the Step S302 (Step S304; image data created at this time are set to be parallax image data). By the reverse rotation, a boundary of the subdivided image data corresponding to the respective original image data is set into the longitudinal direction of the convex lens 12A1.

The same halftone processing as described above is carried out over the parallax image data created at the Step S304 (Step S305). The halftone processing may be carried out in a previous stage to the Step S304, for example, it may be individually carried out over a plurality of compressed original image data. There is executed a processing of generating print data from the image data subjected to the halftone processing, and the processing is thus ended. The print data include raster data indicative of a recording state of a dot in each primary scan and data indicative of an amount of a sub scanning feed, and are created by referring to distribution data in a distribution table. The print data are obtained by mirror image inverting normal print data.

If it is decided that the print data correspond to the separate pixel arrangement at the Step S301, moreover, it is decided whether the printer 10 for carrying out the printing operation corresponds to an oblique ejection or not (whether or not the rocking mechanism is provided or whether or not the rocking mechanism can be used if it is provided) (Step S310). The oblique ejection indicates a state in which the nozzle train 33 is not provided in the paper feeding direction but is inclined by an angle corresponding to the inclination angle θ of the convex lens 12A1 (see FIGS. 18 and 19).

If it is decided that the printer 10 corresponds to the oblique ejection in the decision of the Step S310, moreover, parallax image data corresponding to the oblique ejection are subsequently created (Step S311). When visual image data for the oblique ejection are created at the Step S311, the processing subsequently proceeds to the halftone processing shown in the Step S305. In case of the printer 10 which does not correspond to the oblique ejection, it is preferable to create a processing flow from which the Steps S310 and S311 are omitted.

If it is decided that the printer 10 does not correspond to the oblique ejection at the Step S310 (No), furthermore, the processing of rotating the respective compressed original image data is carried out in the same manner as in the Step S302 (Step S312). Also in the rotation processing, the processing of rotating the respective compressed original image data is carried out corresponding to the inclination angle θ of the convex lens 12A1.

Next to the Step S312, temporary image data corresponding to the separate pixel arrangement are created and visual image data to be a parallax image are created (Step S313). At this time, the respective compressed original image data subjected to the rotation processing are subdivided corresponding to the lens pitch of the convex lens 12A1 in a direction corresponding to the direction of the paper feed in the same manner as in the Step S303. Prior to the subdivision processing, a processing of compressing the respective original image data is carried out also in the direction of the paper feed corresponding to the separate pixel arrangement. In this case, the respective original image data are compressed corresponding to the number of the subdivided image data arranged in the longitudinal direction of the convex lens 12A1. After the compression is ended, the convex lens 12A1 and the pixel data in the respective compressed original image data are arranged one by one to form a matrix of the respective compressed original image data subjected to the compression so that subdivided image data in the matrix are obtained. Thus, the temporary image data are created.

After the temporary image data are created, there is carried out a reverse rotation processing of rotating the temporary image data by an equal rotating angle in a reverse direction to that in the previous Step S312 (at this time, the image data to be created correspond to the visual image data). By the reverse rotation, a boundary between the subdivided image data corresponding to the respective original image data is set in the longitudinal direction of the convex lens 12A1 so that the visual image data corresponding to the separate pixel arrangement are created. In case of the two-dimensional arrangement (the separate pixel arrangement) shown in FIG. 16, the processing of the reverse rotation to the rotation in the Steps S312 and S313 is not necessary. In the case in which a separate pixel is arranged along the solid line portion 12F indicative of the physical boundary of each convex lens 12A1, however, it is necessary to carry out the processing of the reverse rotation to the rotation in the Steps S312 and S313.

When the visual image data are thus created, the processing subsequently proceeds to the halftone processing shown in the Step S305. The foregoing is the processing flow for creating the print data when carrying out the printing operation over the oblique lens sheet having the convex lens 12A1

<Referring to Processing Flow in Execution of Printing Operation>

With reference to FIG. 17, description will be given to the processing of executing a printing operation (Step S40) if it is decided that the convex lens 12A1 is inclined in the decision at the Step S10 (Yes).

In the case in which the printing operation is to be executed, first of all, a pitch regulation of print data based on the visual image data is carried out (Step S401). In the pitch regulation, in the case in which data on a dot corresponding to an ejection of an ink droplet are present in a dent portion of the convex lens 12A1, the regulation is carried out in such a manner that the data on a dot are included in any convex lens 12A1 side. In this case, the regulation is carried out in such a manner that the data on a dot are included in any convex lens 12A1 side corresponding to a rate at which the data on a dot are provided across. The pitch regulation may be carried out in the Step S303 or the Step S313. In case of a dot provided across the convex lens 12A1, moreover, the pitch regulation for regulating the dot to enter any convex lens 12A1 is Used for only an ejection through an ENC signal which will be described below and is not used for an ejection through a lens signal which will be described below. The reason is that the lens ejection is carried out for the same number of dots in all of the convex lenses 12A1. If the regulation is carried out, a pitch is not adapted. In the case in which the pitch regulation is carried out, accordingly, the ejection through the ENC signal is always executed. Next, it is decided whether an ink droplet is ejected or not based on the sheet end 12Et of the lens sheet 12 (Step S402). If it is decided that the ink droplet is ejected based on the sheet end 12Et in the decision (Yes), setting for ejecting the ink droplet is carried out based on the ENC signal (Step S403). The case in which the ENC signal is set to be a reference implies that a certain condition is satisfied, for example, a lens pitch is accurate.

If the ink droplet is ejected without setting the sheet end 12Et to be the reference in the decision of the Step S402 (No), moreover, setting for ejecting the ink droplet is carried out based on the lens signal (Step S404). In this case, the printing operation is executed while the lens pitch of the lens sheet 12 is detected by using the lens detecting sensor 60.

After the setting in the Steps S403 and S404 is ended, moreover, it is subsequently decided whether the printer 10 corresponds to an oblique ejection or not (whether or not the rocking mechanism is provided, or whether or not the rocking mechanism can be used if it is provided) in the same manner as in the Step S310 (Step S405). If it is decided that the printer 10 corresponds to the oblique ejection in the decision (Yes), setting corresponding to the oblique ejection is subsequently carried out (Step S406). If it is decided that the printer 10 does not correspond to the oblique ejection in the Step S405 (No), there is carried out setting corresponding to a normal ejection in place of the oblique ejection (Step S407). In case of the printer 10 which does not correspond to the oblique ejection, it is preferable to set a processing flow from which the Steps S405 and S406 are omitted.

After the Steps S406 and S407 are set, a printing operation corresponding to each setting is executed (Step S408).

Description will be given to an example of the printing operation corresponding to each setting. For example, in the case in which a rocking mechanism capable of sliding one end side of the carriage shaft 21 is provided, the scanning direction of the print head 32 is not orthogonal to the direction of the paper feed, and furthermore, the longitudinal direction of the convex lens 12A1 of the lens sheet 12 is coincident with that of the nozzle train 33 in the printing operation as shown in FIG. 18. In this case, a timing for ejecting the ink droplet is maintained based on the lens signal. For this reason, the printing operation is executed while the timing for ejecting the ink droplet is regulated corresponding to the lens pitch.

In a state shown in FIG. 18, when an amount of a paper feed with the longitudinal direction of the nozzle train 33 set along the paper feeding direction is represented by L, the amount of a paper feed is obtained as $W=L\cos\theta$. When the PF motor 41 is driven in the amount of a paper feed and the ink droplet is ejected by setting the lens signal as a trigger, it is possible to execute an excellent printing operation with respect to the lens sheet 12 to be the oblique lens sheet shown in FIG. 2. In FIG. 18, in the case in which the lens pitch is accurate and a matching property of the lens signal and the ENC signal is excellent, it is also possible to execute the printing operation based on the ENC signal after detecting the sheet end 12Et.

In the case in which the carriage shaft 21 is fixed and a rocking mechanism for rocking the print head 32 with respect to the carriage shaft 21 is provided, for example, the dot of the ink droplet arranged in the convex lens 12A1 is not square but the dot sticks to the lens sheet 12 in a state in which a parallelogram shown in FIG. 19 is formed differently from the case shown in FIG. 18. For this reason, in the case in which the print data corresponding to the ejection of the ink droplet are to be created, the print data are created so as to correspond to a dot arrangement taking a shape of the parallelogram. In this case, when the dot is to be formed based on an edge of the lens signal, the ink droplet is ejected corresponding to pixel data positioned adjacently in a paper feeding direction by one from the dot arrangement in FIG. 18 in the dot arrangement shown in FIG. 19 in a progress by several dots in the scanning direction of the print head 32.

In the case shown in FIG. 19, the main scanning direction of the print head 32 is slightly inclined to the transverse direction of the convex lens 12A1. Therefore, a crossing distance of the convex lens 12A1 in the main scanning direction is longer than that in the transverse direction of the convex lens 12A1. Therefore, the print head 32 can increase the number of dots to be formed every convex lens 12A1.

Figure 20:
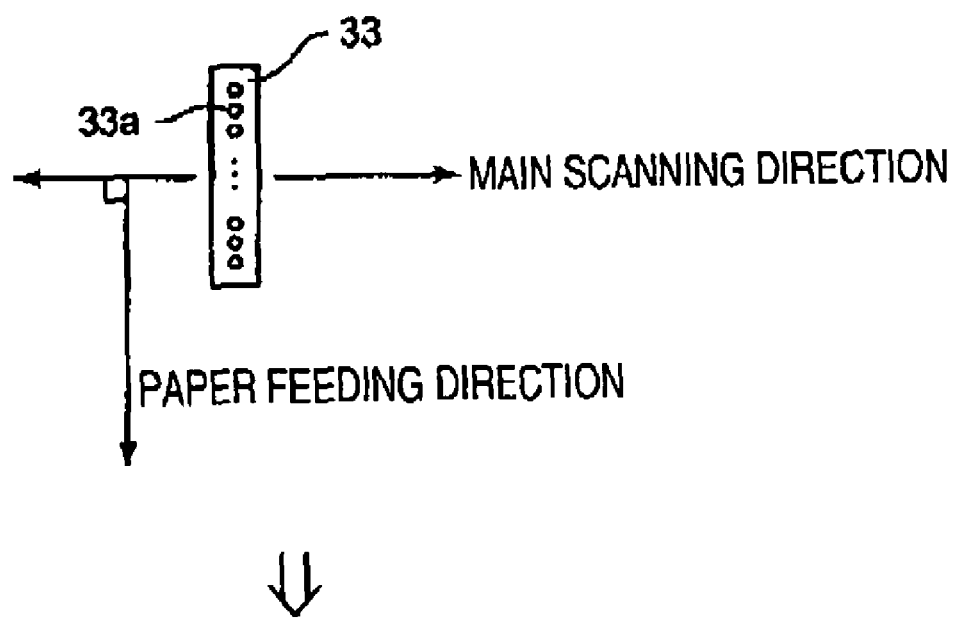
FIG. 20 is a view for explaining a method of forming a dot which can be employed in the printer of FIG. 4, illustrating a state in which a dot is formed in a drive timing regulation of each nozzle.
Figure 20:
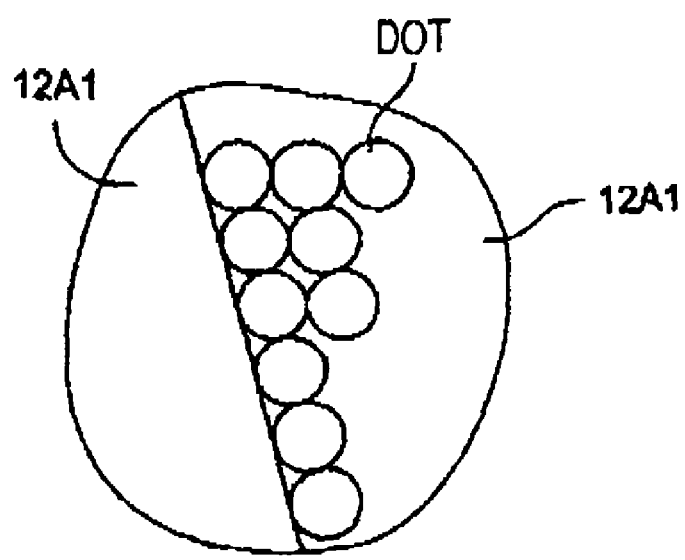

In the case in which the rocking mechanism is not provided but the printing operation is carried out by only the control driving operation of the print head 32, furthermore, it is possible to execute the printing operation in a dot arrangement taking the shape of the parallelogram as shown in FIG. 20 if the timing for ejecting an ink can be originally regulated in the individual nozzle 33a. The case in which the printing operation is carried out by the method will be described below. Also in this case, the ink is ejected by setting the lens signal as a trigger.

<Referring to Generation of Complementary Lens Signal>

Figure 21A:
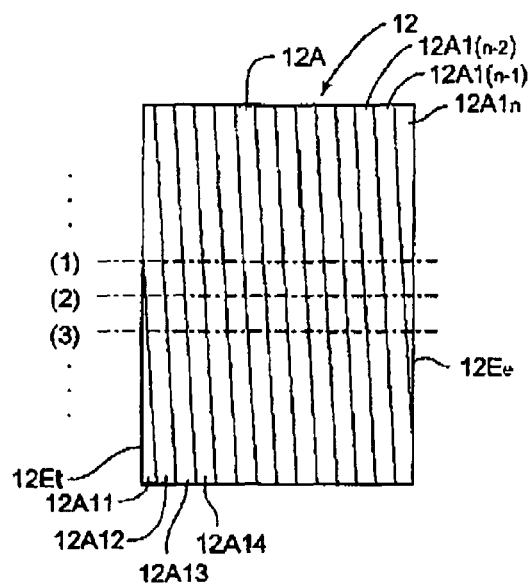
FIGS. 21A and 21B are diagrams for explaining a lens signal generated when carrying out a printing operation by the printer in FIG. 4.
Figure 21B:
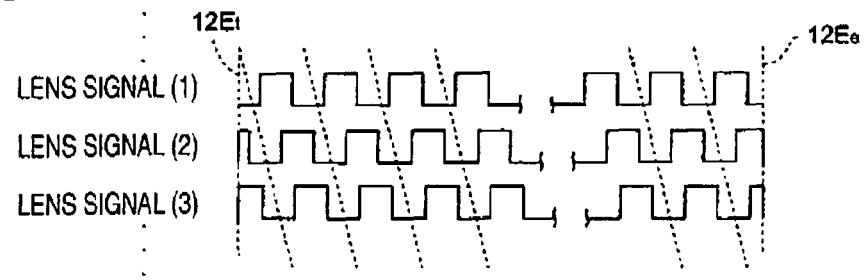

As shown in FIG. 21A, a lens signal is obtained as shown in FIG. 21B when the carriage 30 is moved in the main scanning direction from points (1), (2) and (3) in the sub scanning direction with respect to the lens sheet 12 transported in a direction of an arrow in the drawing. A lens signal (1) indicates a lens signal on the point (1). A lens signal (2) indicates a lens signal on the point (2). Moreover, a lens signal (3) indicates a lens signal on the point (3).

As is apparent from the lens signals (1), (2) and (3), referring to a lens signal in the sheet end 12Et portion of the lens sheet 12 which is first output, the convex lens 12A1 (a convex lens 12A11) placed in a position along the sheet end 12Et is defective on an outside of the sheet end 12Et. Irrespective of the presence of the convex lens 12A1, consequently, a pulse does not appear (the lens signal (1)) and a pulse width is reduced (the lens signals (2) and (3)).

When the ink droplet is ejected based on the pulse having the small pulse width which appears in the lens signals (2) and (3), an ejecting signal for one convex lens 12A1 having a normal width is present as a printing signal in the small pulse width. In the case in which the ink droplet is ejected, consequently, dots are jammed. For this reason, a pattern to be visually observed is also brought into a compression state in a transverse direction or is blurred due to a mixture of the ink droplets. As a result, an image which is not preferable is printed.

Figure 22A:
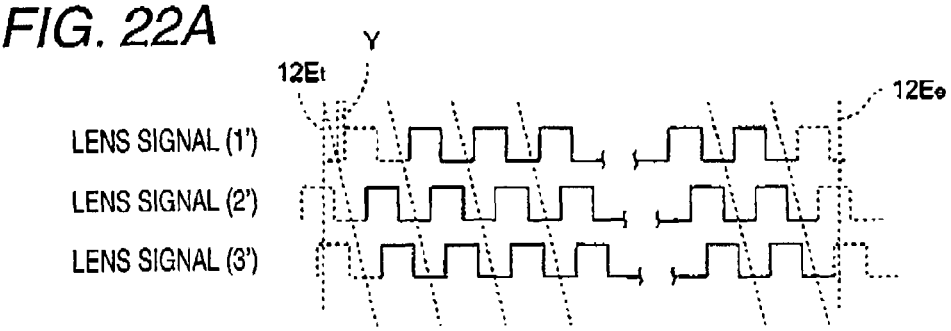
FIGS. 22A and 22B are diagrams for explaining a complementary lens signal generated when carrying out the printing operation by the printer in FIG. 4.

Even if the convex lent 12A1 is defective in the sheet end 12Et as will be described below, therefore, a complementary lens signal for setting a width of a pulse corresponding to the convex lens 12A1 to be equal to a pulse width in another timing in the main scanning direction is generated and the ink droplet is ejected based on the complementary lens signal. Consequently, an image which is not preferable can be prevented from being printed. In FIG. 22A, complementary lens signals for the lens signals (1), (2) and (3) shown in FIG. 21B are indicated as complementary lens signals (1'), (2') and (3'), respectively.

Figure 23:
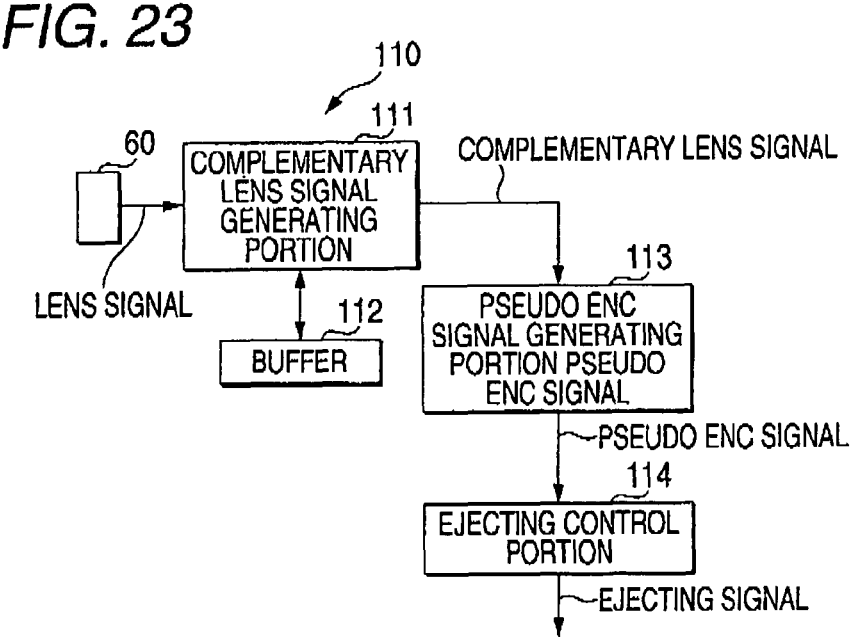
FIG. 23 is a diagram showing a structure of a lens signal processing control portion of the printer in FIG. 4.
Figure 24:
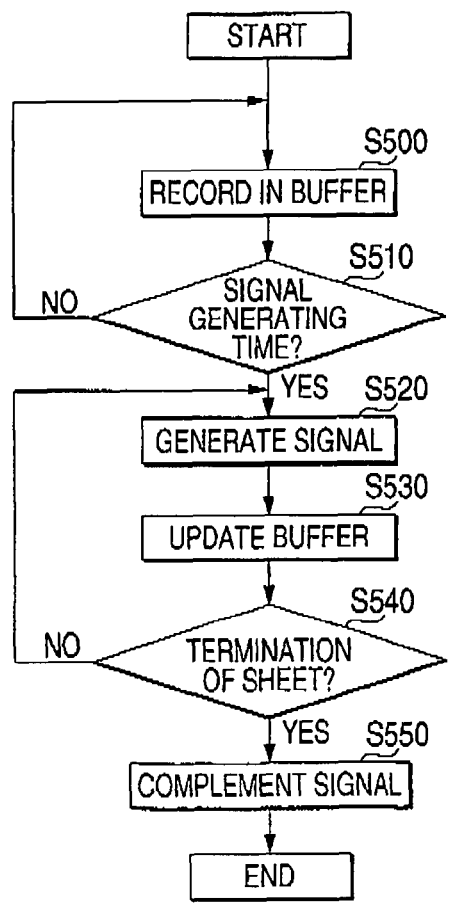
FIG. 24 is a flowchart for explaining the generation of a complementary lens signal which is to be executed by the printer in FIG. 4.

FIG. 23 shows a schematic structure of a lens signal processing control portion 110 for generating a complementary lens signal, a pseudo ENC signal and an ejecting signal from a lens signal and carrying out an ejection control of an ink droplet. In the lens signal processing control portion 110, first of all, the complementary lens signal is generated from the lens signal in a complementary lens signal generating portion 111 by utilizing a butter 112. In a pseudo ENC signal generating portion 113, then, the pseudo ENC signal is generated from the complementary lens signal by utilizing an ENC signal. In an ejecting control portion 114, thereafter, an ejecting signal for ejecting an ink is generated from the pseudo ENC signal.

Figure 25A:
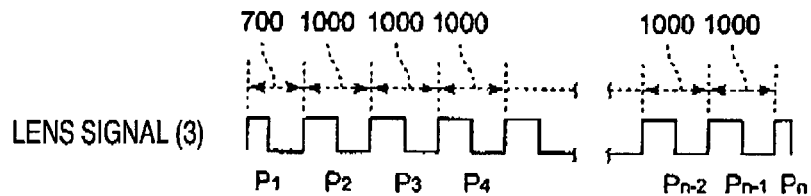
FIGS. 25A, 25B and 25C are diagrams for explaining a process for generating the complementary lens signal in the printer of FIG. 4.

Description will be given to a complementary processing for the lens signal in the complementary lens signal generating portion 111 by taking the lens signal (3) as an example with reference to a processing flow of FIG. 24 and FIGS. 25A, 25B and 25C. Referring to the lens signals (1) and (2), the same processing as that for the lens signal (3) is carried out. Description will be given by taking only the lens signal (3) into FIGS. 25A, 25B and 25C as atypical example. Referring to the lens signal (3), as shown in FIG. 25A, pulses $P_1$, $P_2$, $P_3$, ..., $P_{n-2}$, $P_{n-1}$ and $P_n$ correspond to convex lenses 12A11, 12A12, 12A13, 12A14, ..., 12A1 (n−2), 12A1 (n−1) and 12A1n of the lens sheet 12 shown in FIG. 21A.

Referring to the generation of the complementary lens signal, first of all, an interval of a positive edge (a rising portion) between adjacent pulses of the lens signal (3) is counted according to the number of clocks of a clock signal, and the count value is set to be an arrangement interval of the convex lens 12A1 (Step S500). In the convex lens 12A11 detected first, the sheet end 12Et side of the lens sheet 12 is defective. Therefore, a lens width is detected to be small. Accordingly, an interval of a positive edge between the first pulse $P_1$ and the pulse $P_2$ detecting the convex lens A12 is smaller than an interval of a positive edge between other pulses, for example, the pulses $P_2$ and $P_3$. In other words, an interval in the number of clocks between the first convex lens 12A11 and the next convex lens 12A12 is 700. Referring to the second and subsequent convex lenses 12A12, 12A13, ..., the convex lens 12A1 is present in a perfect form. Therefore, an interval in the number of clocks between the adjacent convex lenses 12A1 is 1000. Referring to the convex lens 12A1n, similarly, the outside of the sheet end 12Ee is defective. For this reason, a width of the pulse $P_n$ is smaller than widths of the other pulses. However, an interval (an arrangement interval) from the last pulse $P_{n-1}$ is 1000 in the same manner as a previous one. The sheet end 12Ee is provided on a side where a printing operation in a printing direction in the main scanning direction of the lens sheet 12 is ended.

The arrangement interval of the convex lens 12A1 counted as the number of clocks is sequentially recorded in the buffer 112 in accordance with a movement of the carriage 30 (Step S500). In this case, the pulse $P_1$ of the lens signal (3) which is first detected corresponds to the convex lens 12A11 in the sheet end 12Et portion of the lens sheet 12 which is defective as described above. For this reason, a positive edge signal is not recorded in the buffer 112. Referring to the other lens signals (1) and (2), similarly, the pulse which is first detected corresponds to the convex lens 12A11 present in the sheet end 12Et portion of the lens sheet 12 which might be defective. For this reason, the positive edge signal is not recorded in the buffer 112.

Figure 25B:
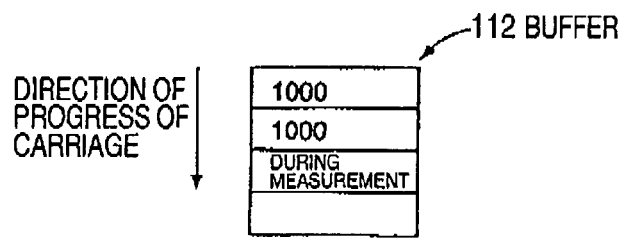

The arrangement interval of the convex lens 12A1 is recorded in the buffer 112 as shown in FIG. 25B. In FIG. 25B, a downward direction corresponds to a direction of a progress of the carriage 30. The buffer 112 can record the arrangement interval among five convex lenses 12A1 as a count value of a clock signal. FIG. 25B shows that an interval between the convex lenses A12 and A13 and an interval between the convex lenses A13 and A14 are recorded as a clock number of 1000, and furthermore, illustrates a state in which an interval between the convex lenses A14 and A15 is being measured.

When a predetermined number of convex lenses 12A1 are detected (Step S510), a complementary lens signal (3') is generated based on the arrangement interval of the convex lens 12A1 recorded in the buffer 112 (Step S520). The predetermined number is to be set in such a manner that a width of the predetermined number of convex lenses 12A1 is smaller than an interval between the print head 32 and the light receiving portion 62 of the lens detecting sensor 60. The reason is as follows. It is necessary for at least the print head 32 to generate a complementary lens signal before reaching the sheet end 12Et of the lens sheet 12 and to provide for the ejection of the ink. In the embodiment, a processing of generating a complementary lens signal (Step S520) is carried out after waiting for a detection of a fourth positive edge of the lens signal (3).

Figure 25C:
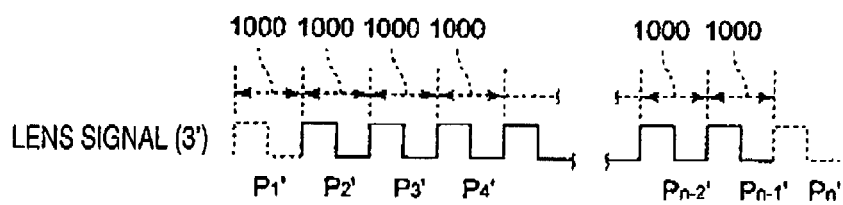

A complementary lens signal (3') is generated based on the arrangement interval of the convex lens 12A1 which is recorded in the buffer 112. By setting a first half (500) of the arrangement interval of the number of clocks which is 1000 to be an Hi signal and a second half (500) to be an Lo signal, the complementary lens signal (3') shown in FIG. 25C is generated. On the assumption that the complementary lens signal (3') might be defective, a pulse $P_1'$ shown in a dotted line is complemented in place of the pulse $P_1$ of the lens signal (3) which has not been recorded in the buffer 112. In the embodiment, a pulse $P_2'$ is used for the complementary pulse $P_1'$. The pulse $P_2'$ corresponds to the pulse $P_2$ and a pulse $P_3'$ corresponds to the pulse $P_3$. Moreover, a pulse $P_4'$ corresponds to the pulse $P_4$.

Based on the lens signal (3) detected according to the movement of the carriage 30 toward the sheet end 12Ee, then, the complementary lens signal (3') is generated (Step S520). The buffer 112 is constituted to record the arrangement interval among five convex lenses 12A1 as described above, and updates the contents of the disposition of the convex lens 12A1 which is sequentially recorded according to the movement of the carriage 30 (Step S530).

When the carriage 30 is moved from the sheet end 12Et to the sheet end 12Ee side of the lens sheet 12, the lens signal (3) having the pulses $P_1, P_2, P_3, P_4, \ldots, P_{n-2}, P_{n-1}$ and $P_n$ is output as shown in FIG. 25A corresponding to the convex lenses 12A11, 12A12, 12A13, 12A14, . . . , 12A1 (n−2), 12A1 (n−1) and 12A1n. Based on the lens signal (3), then, a complementary lens signal (3') shown in FIG. 25C is generated. The pulses $P_1', P_2', P_3', P_4', \ldots, P_{n-2}', P_{n-1}'$ and $P_n'$ of the complementary lens signal (3') correspond to the pulses $P_1, P_2, P_3, P_4, \ldots, P_{n-2}, P_{n-1}$ and $P_n$ of the lens signal (3), respectively.

Figure 26:
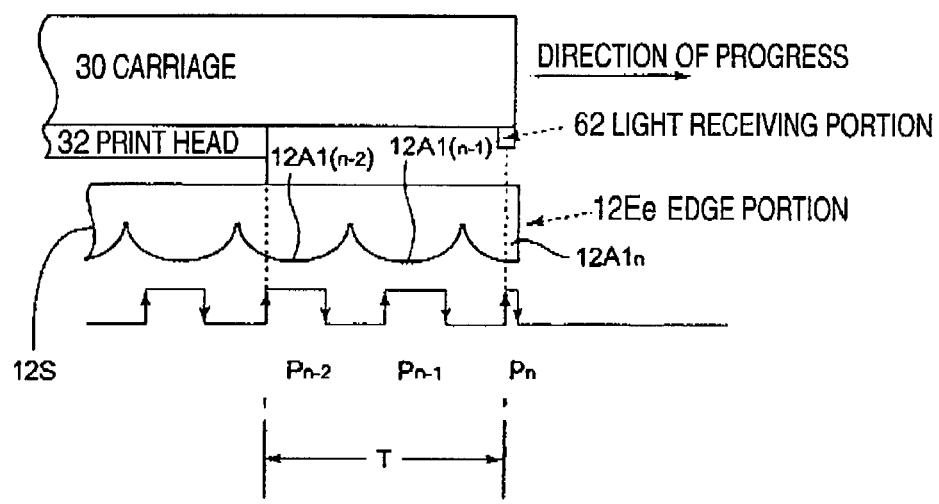
FIG. 26 is a diagram showing a positional relationship among a print head, a light receiving portion, a convex lens and a lens signal on a sheet end at a print ending side of the lens sheet in the printer of FIG. 4.

Whether the carriage 30 is moved to the sheet end 12Ee side of the lens sheet 12 is decided in the following manner. FIG. 26 shows a positional relationship among the print head 32, the light receiving portion 62 of the lens detecting sensor 60 and the convex lens 12A1 in the sheet end 12Ee of the lens sheet 12. When the carriage 30 is moved from the sheet end 12Et side to the sheet end 12Ee side and the lens detecting sensor 60 gets over a convex lens 12A1n present in the sheet end 12Ee of the lens sheet 12, the convex lens 12A1 is not present later. For this reason, the lens signal (3) is not output. In the case in which the lens signal (3) is not detected even if the carriage 30 is moved by a predetermined distance after the pulse $P_n$ of the lens signal (3) of the convex lens 12A1n is detected, therefore, it is decided that the lens detecting sensor 60 detects the sheet end 12Ee of the lens sheet 12. The predetermined distance is set to be equivalent to 1.5 times as great as an interval from the convex lens 12A1 (n−1) which is detected immediately before the convex lens 12A1n, for example. In the case in which the lens signal (3) is not detected even if the carriage 30 is moved by the same distance, it is decided that the carriage 30 is moved to a position placed beyond the sheet end 12Ee of the lens sheet 12 in the position of the light receiving portion 62 (Step S540).

In some cases, the convex lens 12A1n is defective also in the sheet end 12Ee of the lens sheet 12 as shown in FIG. 26. Also in this case, the pulse $P_n$ of the lens signal which has a small pulse width is generated in the same manner as in the case in which the convex lens 12A11 in the sheet end 12Et is defective. If an ejecting signal corresponding to one convex lens 12A1 having a normal width is present in the small pulse width, dots are jammed when an ink droplet is ejected. Thus, a pattern to be visually observed is not preferable.

If it is decided that the light receiving portion 62 of the lens detecting sensor 60 reaches the sheet end 12Ee of the lens sheet 12 (Step S540), therefore, a complementary processing is carried out by using the pulse $P_{n-1}'$ corresponding to a lens interval from the convex lens 12A1(n−1) present immediately before the convex lens 12A1n as the pulse $P_n'$ corresponding to the convex lens 12A1n as in the complementary lens signal (3') shown in FIG. 25C.

As described above, the complementary lens signal (3') is generated. By ejecting the ink droplet based on the complementary lens signal (3'), it is possible to ensure almost the same printing quality as that in the other portions even if the lens signal (3) has a pulse in a small width.

The complementary lens signal (3') is generated based on the lens signal (3) according to the movement of the carriage 30. Then, the print head 32 starts to eject the ink droplet based on the ink ejecting signal generated on the basis of the complementary lens signal (3') according to an arrival at the sheet end 12Et of the lens sheet 12.

In the embodiment, as shown in FIG. 6, the light receiving portion 62 provided in the carriage 30 is disposed in a position ahead of the print head 32 in the main scanning direction. When the lens signal (3) is detected and the carriage 30 is then moved by a distance T between the light receiving portion 62 and the print head 32, accordingly, the ink droplet is started to be ejected. The light receiving portion 62 of the lens detecting sensor 60 is to be provided ahead of the print head 32 in the main scanning direction. The reason is as follows. The lens signal (3) is output from the lens detecting sensor 60 and the complementary lens signal (3') is then generated, and the ejecting signal is thereafter generated as will be described below based on the complementary lens signal (3'). Subsequently, the ink droplet is ejected based on the ejecting signal. Therefore, a time lag is made from the output of the lens signal (3) to the ejection of the ink droplet.

The complementary lens signal (3') generated sequentially in the complementary lens signal generating portion 111 in accordance with the movement of the carriage 30 is generated, and at the same time, is output to the pseudo ENC signal generating portion 113, and the pseudo ENC signal is generated. The pseudo ENC signal is generated by multiplying the complementary lens signal (3') by a certain coefficient corresponding to a resolution of the ENC signal. For example, when the lens has an arrangement pitch of 45 lpi and the ENC signal has a resolution of 180 dpi, a signal obtained by multiplying a cycle of the complementary lens signal (3') by four (180÷45) is set to be the pseudo ENC signal in order to adapt the cycle of the complementary lens signal (3') to the resolution of the ENC signal.

Based on the pseudo ENC signal, furthermore, the ink ejecting signal is generated in the ejecting control portion 114. Based on the ejecting signal, the ink droplet is ejected.

The ejecting signal is generated by multiplying the pseudo ENC signal by a certain coefficient corresponding to a printing resolution. For example, if the printing resolution is 1440 dpi, a signal obtained by multiplying the cycle of the pseudo ENC signal by eight (1440÷180) is generated as the ejecting signal in order to correspond to the printing resolution.

The printer 10 executes the printing operation by ejecting the ink droplet to a predetermined position of the lens sheet 12 in response to the ejecting signal output in accordance with the movement of the carriage 30 while moving the carriage 30 in the main scanning direction.

As described above, therefore, the light receiving portion 62 of the lens detecting sensor 60 is disposed in a position ahead of the print head 32 in the direction of the movement of the carriage 30. For this reason, the print head 32 reaches the convex lens 12A1 detected by the lens detecting sensor 60 later than a detecting point in time. Accordingly, it is necessary to carry out the ejection when the print head 32 reaches the convex lens 12A1 corresponding to the ejecting signal. For example, in the case in which the ink is ejected in response to the ejecting signal generated based on the pulse $P_1$ of the lens signal (3), it is necessary to eject the ink when the print head 32 reaches the convex lens 12A11.

For this reason, the ejection is carried out in response to the ejecting signal later corresponding to the distance T in the main scanning direction between the light receiving portion 62 and the print head 32. More specifically, for example, if the lens has a resolution of 45 lpi, the ENC signal has a resolution of 180 dpi and the printing resolution is 1440 dpi as described above, one wavelength of the ejecting signal is equivalent to 0.0177 mm. If the distance (interval) T between the light receiving portion 62 and the print head 32 is set to be 1.77 mm, for example, a print position on the lens sheet 12 corresponding to the ejecting signal is coincident with an ejecting position when the ejection is carried out in a delayed timing corresponding to 100 wavelengths after the ejecting signal is output.

For simplicity of the description, the ejecting signal and the ejection timing are adapted to each other based on the distance T between the light receiving portion 62 and the print head 32. Actually, an interval between the ink ejecting nozzle 33a of the print head 32 and the light receiving portion 62 is set to be a reference. In consideration of a generation time required for generating the ejecting signal from the lens signal (3) and other mechanical or electrical loss times, moreover, the ejection timing is determined.

As described above, the carriage 30 is moved in the main scanning direction and the printing operation is then carried out from the sheet end 12Et to the sheet end 12Ee for the point (3) shown in FIG. 21(A). Thereafter, the lens sheet 12 is fed in the sub scanning direction by means of a paper feeding mechanism, and at the same time, the carriage 30 is returned to the sheet end 12Et side of the lens sheet 12. Subsequently, the printing operation is carried out for the points (2) and (3). In other words, the complementary lens signals (1') and (2') shown in FIG. 22A are generated from the lens signals (1) and (2) shown in FIG. 21B, and furthermore, the ejecting signal is generated based on the complementary lens signals (1) and (2) so that the printing operation is carried out.

While the description has been given to the printing operation for only the points (1), (2) and (3) in the middle of the sub scanning direction of the lens sheet 12 shown in FIG. 21A, the same printing operation as described for the point (3) is carried out every transport pitch of the lens sheet 12 from a front end side in the direction of the transport of the lens sheet 12 toward a rear end side of the lens sheet 12.

The complementary lens signal is generated as if the convex lens 12A1 is provided on the outside of the lens sheet 12 where the convex lens 12A1 is not actually present. On the assumption that the ink droplet is ejected on the basis of the complementary lens signal, accordingly, the ink is ejected to the outside of the lens sheet 12 so that the plate 50 is contaminated.

Therefore, it is proper that the sheet end 12Et and the sheet end 12Ee of the lens sheet 12 are detected by the lens sheet detecting sensor 63 and the ink droplet is not ejected when the print head 32 is positioned on the outside of the lens sheet 12.

In other words, even if the ink droplet is to be originally ejected in response to the ejecting signal when the print head 32 is disposed in a position where the convex lens 12A1 is not actually present, idling is carried out in order not to eject the ink droplet before the print head 32 reaches the sheet end 12Et of the lens sheet 12. More specifically, the ink droplet is ejected in accordance with the ejecting signal based on image data. However, a contro is actually carried out so as not to eject the ink droplet. By controlling the ejection of the ink droplet, thus, a print image is printed corresponding to a width in the main scanning direction of the lens sheet 12.

In the following manner, it is decided whether the print head 32 reaches the sheet end 12Et of the lens sheet 12 or not. The lens sheet detecting sensor 63 is disposed in a position ahead of the print head 32 in the main scanning direction in the same manner as the light receiving portion 62 of the lens detecting sensor 60. When the sheet end 12Et is detected by means of the lens sheet detecting sensor 63 and the carriage 30 is then moved by the distance T in the main scanning direction between the lens sheet detecting sensor 63 and the print head 32, accordingly, the ink droplet is ejected on the assumption that the print head 32 reaches the sheet end 12Et of the lens sheet 32. A moving distance of the carriage 30 after the lens sheet detecting sensor 63 detests the sheet end 12Et is measured in response to the ENC signal. In the embodiment, the lens sheet detecting sensor 63 and the lens detecting sensor 60 are provided at the same distance T in the main scanning direction with respect to the print head 32.

Also in the sheet end 12Ee of the lens sheet 12, moreover, the complementary lens signal is generated as if the convex lens 12A1 is provided on the outside of the lens sheet 12 where the convex lens 12A1 is not actually present. On the assumption that the ink droplet is ejected on the basis of the complementary lens signal, accordingly, the ink is ejected to the outside of the lens sheet 12 so that the platen 50 is contaminated.

When the lens sheet detecting sensor 63 detects the sheet end 12Ee and the carriage 30 is then moved by the distance T in the main scanning direction between the lens sheet detecting sensor 63 and the print head 32, therefore, the ejection of the ink droplet is stopped on the assumption that the print head 32 reaches the sheet end 12Ee of the lens sheet 32.

At the outside of the sheet end 12Et of the lens sheet 12, the ink is not ejected but the image data are consumed. More specifically, the printing operation for the lens sheet 12 is wholly carried out with a bias corresponding to a complementary signal toward the sheet end 12Et side. In the sheet end 12Ee on the opposite side of the sheet end 12Et of the lens sheet 12, accordingly, there is a possibility that the image data might be used up to disable the printing operation. Therefore, the image data for the main scanning direction are created to be slightly larger than the width in the main scanning direction of the lens sheet 12. By creating the image data, thus, it is possible to prevent the image data to be printed from being used up in the sheet end 12Ee even if the image data are consumed on the outside of the sheet end 12Et of the lens sheet 12.

Moreover, it is preferable that the complementary lens signal should be biased toward the sheet end 12Et side corresponding to a width Y shown in FIG. 22(A). The width Y indicates a distance between the positive edge of the complementary lens signal and the dent portion of the convex lens 12A1. By biasing the complementary lens signal corresponding to the width Y toward the sheet end 12Et side and causing the position of the positive edge of the complementary lens signal to be coincident with that of the dent portion of the convex lens 12A1, it is easy to adjust the start of the ejection of the ink droplet to each convex lens 12A1 to a position in which a convex portion of the convex lens 12A1 is started. In other words, the ink droplet can be ejected accurately corresponding to the width of each convex lens 12A1.

As is apparent from the lens signal (1) shown in FIG. 21B and the complementary lens signal (1') shown in FIG. 22A corresponding thereto, a pulse does not appear in a signal in a corresponding portion to the convex lens 12A11 even if the convex lens 12A11 is very small. In other words, referring to a place in which an amount of a defect of the lens is large and a residual portion is lessened, the pulse does not appear in the lens signal. Accordingly, the pulse does not appear in the complementary lens signal. For this reason, the ejecting signal is not generated. In such a portion, the ink is not ejected.

Figure 22B:
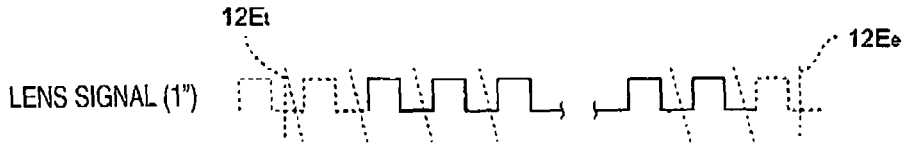

If a width of a pulse appearing first (a sum of a convex portion and a concave portion) is represented as 1000 in the number of clocks as in the example described above, it is decided that the sheet end 12Et of the lens sheet 12 has the convex lens 12A11 although a residual portion is lessened. As shown in FIG. 22B, there is generated a complementary lens signal (1") having two complementary signals with a pulse corresponding to the number of clocks of 1000 on the sheet end 12Et side (a signal shown in a dotted line on the sheet end 12Et side in the drawing).

Thus, the ink can also be ejected to the convex lens 12A11 portion remaining slightly in the sheet end 12Et portion. Thus, characters and images can be printed over the whole sheet end 12Et of the lens sheet 12.

According to the lens sheet 12 and the printer 10 which have the structures, and the printing method, the reference direction L of the lens sheet 12 is inclined with the inclination angle θ with respect to the longitudinal direction of the convex lens 12A1. In addition, the lens sheet 12 takes an external shape of a rectangle or a square, and each convex lens 12A is disposed with an inclination to the sheet end E. Therefore, waste can be avoided and a printing width can be increased. When the lens sheet 12 is rotated, moreover, the angle of the surface of the convex lens 12A1 is changed in the reference direction L of the lens sheet 12 in addition to the crossing direction of the convex lens 12A1. Consequently, compressed original image data constituting a parallax image can be disposed linearly in a transverse direction, and furthermore, like a plane. In the case in which a parallax image corresponding to a plurality of parallaxes is visually observed, the parallax image is switched smoothly so that a natural impression can be given to a user to carry out the visual observation.

Moreover, the lens sheet 12 has a rectangular appearance, and furthermore, the sheet end 12Et is provided in parallel with the reference direction L. Consequently, the reference direction L of the lens sheet 12 is parallel with the sheet end 12Et so that the user can easily see the reference direction L in the visual observation. Moreover, it is easy to carry out an operation such as a paper feed in the printer 10.

The inclination angle θ ranges from 5 to 15 degrees. In the case in which the lens sheet 12 is rotated by 5 to 15 degrees based on the reference direction L, therefore, a visual image can be switched well. In the case in which the visual image corresponds to a three-dimensional image, particularly, the three-dimensional image can be switched smoothly so that an excellent visibility for the user can be obtained. The inclination angle δ may range from 0.1 to 45 degrees.

By causing the print head 32 to carry out a scan so as to pass through the points A and B as in the printer 10, moreover, it is decided whether the lens sheet 12 is a normal lens sheet or has the convex lens 12A1 inclined. Also in the case in which it is decided that the convex lens 12A 1 is inclined, it is possible to carry out the printing operation well with a distinction from the normal lens sheet. More specifically, the convex lens 12A1 is inclined and the ink droplet corresponding to the visual image data is ejected every lens pitch, and an oblique print can be carried out.

In the case in which the lens pitch is measured on two points as shown in FIGS. 13A and 13B, it is possible to properly calculate the inclination angle θ in one of the longitudinal directions of the convex lens 12A1. In consideration of the inclination angle of the convex lens 12A1, it is possible to eject the ink droplet in a proper position. Consequently, it is possible to prevent a print image (corresponding to print contents) from being shifted or curved as in the case in which the ink droplet is ejected without taking the inclination angle of the convex lens 12A1 into consideration.

In the case in which the ejection of the ink droplet from the print head 32 can be controlled every nozzle 33a as shown in FIG. 20, furthermore, it is possible to regulate a timing for ejecting the ink droplet every nozzle 33a. Also in the lens sheet 12 in which the longitudinal direction of the convex lens 12A1 is inclined to a direction of a paper feed, therefore, original image data corresponding to a parallax are present in visual image data for each lens pitch of each convex lens 12A1 and it is possible to execute the printing operation while shifting the timing for ejecting an ink from the nozzle 33a in order to correspond to the inclination. Even if a rocking mechanism for rocking the print head 32 is not provided, consequently, it is possible to carry out a printing operation corresponding to the inclination of the convex lens 12A1 well.

Moreover, the lens signal is a pulse signal having a pulse width varied corresponding to a width of the convex lens 12A1. When deciding that the convex lens 12A1 has a small width in the vicinity of the sheet end 12Et of the lens sheet 12 by the detection of the lens signal, furthermore, the control portion 100 carries out a complementary processing to have the same pulse width as pulse widths in the other portions. Consequently, it is possible to eliminate a state in which print data (dots) corresponding to parallax image data on a plurality of parallaxes are jammed in a lens signal having a small pulse width, and to ensure almost the same printing quality as that in the other portions.

In the case in which the continuous pixel arrangement shown in FIG. 15 is employed, moreover, parallax image data are constituted from a plurality of compressed original image data subdivided corresponding to a lens pitch in such a direction as to cross the convex lens 12A1. In this case, even if the convex lens 12A1 is inclined to the reference direction L, a parallax image in which an image for each parallax can be switched well can be printed on the lens sheet 12. Furthermore, the main scanning direction is oblique to the longitudinal direction of the convex lens 12A1. Therefore, a distance in the main scanning direction can be slightly increased and the number of dots to be made can be increased. Thus, it is possible to enhance the printing quality.

In the case in which the separate pixel arrangement shown in FIG. 16 is employed, moreover, parallax image data formed by a plurality of original image data are compressed and subdivided, and are then arranged in a matrix. Consequently, the subdivided and compressed original image data are arranged only in such a direction as to cross the convex lens 12A1, and more pixel data (compressed and subdivided image data) can be arranged as compared with in the case shown in FIG. 15. Consequently, in the case in which a three-dimensional image is visually seen by a user, for example, it is possible to correspond to a motion parallax. Thus, the user can recognize a three-dimensional image in a more natural state.

While the embodiment of the invention has been described above, the invention can be variously changed. This will be described below.

Although the convex lens 12A1 has a rightward and downward inclination in the embodiment, it may have a leftward and downward inclination. Moreover, the printing operation may be carried out in a state of a rotation by 90 degrees from the state shown in FIG. 2. While the structure having the rocking mechanism of the carriage shaft 21, the structure having another rocking mechanism and the structure having no rocking mechanism have been briefly described above, moreover, these are selective elements and any of them is provided in principle. However, it is also possible to employ a structure having all of them or a structure which selectively has two of them.

While the printing operation is carried out over the lens sheet 12 by directly transporting the lens sheet 12 in the sub scanning direction without using a tray in the embodiment, it is also possible to use a special tray in the printing operation. It is also possible to use a tray in which a fitting portion corresponding to a size of the lens sheet 12 is present in the tray, and the longitudinal direction of the convex lens 12A1 is set along the direction of the paper feed and the sheet end E of the lens sheet 12 is inclined in the direction of the paper feed when the lens sheet 12 is fitted in the fitting portion. When the printing operation is carried out by using the tray, it is possible to ensure the printing quality even if a special mechanism such as a rocking mechanism is not provided. Moreover, it is also possible to move the print head 32 in the main scanning direction and the sub scanning direction without transporting the lens sheet 12.

In the embodiment, furthermore, only one lens detecting sensor 60 is provided in the portion separated from the home position. However, the number of the lens detecting sensors 60 is not limited to one but a plurality of carriages 30 may be provided. For example, in the case in which the lens detecting sensor 60 is attached to both ends in the main scanning direction in the lower surface of the carriage 30 respectively, it is possible to measure a lens pitch prior to the printing operation in each reciprocation of the carriage 30. Thus, the printing operation for the lens sheet 12 can be executed in each reciprocation.

In the embodiment, moreover, the ENC signal and the lens signal are the pulse signals and the encoder cycle information and the lens cycle information are measured through their positive edges. However, they may be measured through negative edges. In addition, the ENC signal and the lens signal may be analog signals. In the case in which they are the analog signals, it is possible to calculate a count value if a predetermined threshold of a voltage is set to be the encoder cycle information or the lens cycle information.

While the lens sheet 12 has the structure in which a large number of convex lenses 12A1 are arranged in the embodiment, moreover, the lens sheet is not restricted thereto but has a structure in which a large number of concave lenses are arranged. In this case, it is preferable that each of the processings should be based on a detection of the negative edge in place of the positive edge.

While the printer 10 can execute the printing operation in the embodiment, moreover, it is not restricted to the execution of only the printing operation but may be a compound printer having at least one function of a copy, a fax and a scanner. In the embodiment, furthermore, the description has been given to the case of a direct drawing type for directly printing a print image on the lens sheet 12. However, it is a matter of course that the invention can also be applied to the case of an isolation type for sticking a separately printed matter to the lenticular lens 12A.

What is claimed is:

1. A printer capable of performing a printing of at least one of a character and an image onto a lens sheet having an external shape of a rectangle or a square defined by four sheet ends in a vertical direction thereto and including a first surface on which a plurality of lenses extending in a direction are arranged in parallel with each other, and a second surface opposite to the first surface, on which the printing is to be performed, the printer comprising:

a deciding unit, operable to decide whether or not each of the plurality of lenses is inclined to one of the sheet ends;

a signal generating unit, when the deciding unit decides that each of the plurality of lenses is inclined to the one of the sheet ends, based on a lens signal including a series of signals each of which has a cyclic width corresponding to a width of one of the plurality of lenses and which are successively output, operable to generate a complementary lens signal in which a first signal of the series of signals which is first output and which corresponds to a defective pulse portion is replaced by a signal which has a pulse having no defect and a width of which is the same as a width of a signal of the series of signals that is output subsequent to the first signal; and a printing unit, operable to perform the printing on the lens sheet based on the complementary lens signal.

2. The printer according to claim 1, wherein a second signal of the series of signals which is finally output and which corresponds to a defective pulse portion is replaced in the complementary lens signal by a signal which has a pulse having no defect and a width of which is the same as a width of a signal of the series of signals that is output prior to the second signal.

* * * * *